United States Patent
Pilly et al.

(10) Patent No.: US 10,664,749 B1
(45) Date of Patent: May 26, 2020

(54) PREFRONTAL MODULATION OF CONTEXT-SPECIFIC MEMORY ENCODING AND RETRIEVAL IN THE HIPPOCAMPUS

(71) Applicant: HRL Laboratories, LLC, Malibu, CA (US)

(72) Inventors: Praveen K. Pilly, West Hills, CA (US); Michael D. Howard, Westlake Village, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 935 days.

(21) Appl. No.: 15/093,730

(22) Filed: Apr. 7, 2016

Related U.S. Application Data

(63) Continuation-in-part of application No. 14/671,049, filed on Mar. 27, 2015, now abandoned.

(60) Provisional application No. 61/972,086, filed on Mar. 28, 2014, provisional application No. 62/145,200, filed on Apr. 9, 2015.

(51) Int. Cl.
  *G06N 3/08* (2006.01)
(52) U.S. Cl.
  CPC ........................ *G06N 3/08* (2013.01)
(58) Field of Classification Search
  CPC ......................................................... G06N 3/08
  See application file for complete search history.

(56) References Cited

U.S. PATENT DOCUMENTS

2013/0325202 A1* 12/2013 Howard ............... B60W 30/08
  701/1

OTHER PUBLICATIONS

Paine et al., "Motor primitive and sequence self-organization in a hierarchical recurrent neural network", Oct.-Nov. 2004, Neural Networks, vol. 17, Issues 8-9, pp. 1291-1309 (Year: 2004).*

Banquet et al., "A Hippocampal Model of Visually Guided Navigation as Implemented by a Mobile Agent", Jul. 27, 2000, Proceedings of the IEEE-INNS-ENNS International Joint Conference on Neural Networks. IJCNN 2000. Neural Computing: New Challenges and Perspectives for the New Millennium, pp. 41-46 (Year: 2000).*

Ziemke et al., "Neuromodulation of Reactive Sensorimotor Mappings as a Short-Term Memory Mechanism in Delayed Response Tasks", Jul. 1, 2002, Adaptive Behavior, 10(3/4), pp. 185-199 (Year: 2002).*

(Continued)

*Primary Examiner* — Hal Schnee
*Assistant Examiner* — Brent Johnston Hoover
(74) *Attorney, Agent, or Firm* — Tope-McKay & Associates

(57) ABSTRACT

Described is a system for storing and retrieving a memory in context. A memory formed for a given context is encoded in a neural model of the entorhinal-hippocampal system, forming a context-appropriate memory. The context-appropriate memory is comprised of an association between presented environmental cues and presence of a rewarded event. The system is able to discriminate between environmental cues in an environment surrounding a vehicle and retrieve at least one encoded context-appropriate memory. Using the at least one retrieved encoded context-appropriate memory, the system determines whether to initiate a collision avoidance operation to cause the vehicle to proactively avoid a collision.

12 Claims, 25 Drawing Sheets

(56) References Cited

OTHER PUBLICATIONS

Ogata et al, "Extracting Multi-Modal Dynamics of Objects using RNNPB", 2005, Journal of Robotics and Mechatronics, vol. 17, No. 6, pp. 681-688 (Year: 2005).*
Arritt et al., "Context-Sensitive Weights for a Neural Network", Jun. 18, 2003, Lecture Notes in Computer Science, vol. 2680, pp. 1-12 (Year: 2003).*
Lee et al., "Contextual behavior and neural circuits", May 10, 2013, frontiers in Neural Circuits, pp. 1-21 (Year: 2013).*
Wang et al, "Neural Modeling of Episodic Memory: Encoding, Retrieval, and Forgetting", Oct. 2012, IEEE Transactions on Neural Networks and Learning Systems, vol. 23, No. 10, pp. 1574-1586 (Year: 2012).*
Pata et al., "Hippocampal Based Model Reveals the Distinct Roles of Dentate Gyrus and CA3 during Robotic Spatial Navigation", 2014, Living Machines 2014, pp. 273-283 (Year: 2014).*
Nakanishi, K., Saito, H., and Abe, K. (2001). The supramammillary nucleus contributes to associative EPSP-spike potentiation in the rat dentate gyrus in vivo. Eur. J. Neurosci. 13, pp. 793-800.
Nakazawa, K., Quirk, M.C., Chitwood, R.A., Watanabe, M., Yeckel, M.F., Sun, L.D., Kato, A., Carr, C.A., Johnston, D., Wilson, M.A., et al. (2002). Requirement for hippocampal CA3 NMDA receptors in associative memory recall. Science 297, pp. 211-218.
Navawongse, R., and Eichenbaum, H. (2013). Distinct pathways for rule-based retrieval and spatial mapping of memory representations in hippocampal neurons. J. Neurosci. Off. J. Soc. Neurosci. 33, pp. 1002-1013.
O'Reilly, R.C. (2004). The Division of Labor Between the Neocortex and Hippocampus. In Connectionist Modeling in Cognitive Psychology, G. Houghton, ed. (Psychology Press), p. 488.
O'Reilly, R.C., and Rudy, J.W. (2001). Conjunctive representations in learning and memory: Principles of cortical and hippocampal function. Psychol. Rev. 108, pp. 311-345.
O'Reilly, R.C., Bhattacharyya, R., Howard, M.D., and Ketz, N. (2014). Complementary Learning Systems. Cogn. Sci. 38, pp. 1229-1248.
Peters, G.J., David, C.N., Marcus, M.D., and Smith, D.M. (2013). The medial prefrontal cortex is critical for memory retrieval and resolving interference. Learn. Mem. Cold Spring Harb. N 20, pp. 201-209.
Ramirez, S., Liu, X., Lin, P.-A., Suh, J., Pignatelli, M., Redondo, R.L., Ryan, T.J., and Tonegawa, S. (2013). Creating a False Memory in the Hippocampus. Science 341, pp. 387-391.
Rumelhart, D.E., and Zipser, D. (1986). Parallel Distributed Processing: Explorations in the Microstructure of Cognition, vol. 1. D.E. Rumelhart, J.L. McClelland, and C. PDP Research Group, eds. (Cambridge, MA, USA: MIT Press), pp. 151-193.
Schmidt, B., Marrone, D.F., and Markus, E.J. (2012). Disambiguating the similar: The dentate gyrus and pattern separation Behav. Brain Res. 226, pp. 56-65.
Shahidi, S., Motamedi, F., and Naghdi, N. (2004). Effect of reversible inactivation of the supramammillary nucleus on spatial learning and memory in rats. Brain Res. 1026, pp. 267-274.
Squire, L.R., and Alvarez, P. (1995). Retrograde amnesia and memory consolidation: a neurobiological perspective. Curr. Opin. Neurobiol. 5, pp. 169-177.
Thompson, L.T., and Best, P.J. (1989). Place cells and silent cells in the hippocampus of freely-behaving rats. J. Neurosci. Off. J. Soc. Neurosci. 9, pp. 2382-2390.
Treves, A., and Rolls, E.T. (1994). Computational analysis of the role of the hippocampus in memory. Hippocampus 4, pp. 374-391.
Vertes, R.P. (2004). Differential projections of the infralimbic and prelimbic cortex in the rat. Synap. N. Y. N 51, pp. 32-58.
Vertes, R.P., and McKenna, J.T. (2000). Collateral projections from the supramammillary nucleus to the medial septum and hippocampus. Synap. N. Y. N 38, pp. 281-293.

Vertes, R.P., Hoover, W.B., Szigeti-Buck, K., and Leranth, C. (2007). Nucleus reuniens of the midline thalamus: link between the medial prefrontal cortex and the hippocampus. Brain Res. Bull. 71, pp. 601-609.
Weel, M.J.D.-V. der, Silva, F.H.L. da, and Witter, M.P. (1997). Nucleus Reuniens Thalami Modulates Activity in Hippocampal Field CA1 through Excitatory and Inhibitory Mechanisms. J. Neurosci. 17, pp. 5640-5650.
Wimber, M., Bäuml, K.-H., Bergström, Z., Markopoulos, G., Heinze, H.-J., and Richardson-Klavehn, A. (2008). Neural markers of inhibition in human memory retrieval. J. Neurosci. Off. J. Soc. Neurosci. 28, pp. 13419-13427.
Wyss, J.M., Swanson, L.W., and Cowan, W.M. (1979). A study of subcortical afferents to the hippocampal formation in the rat. Neuroscience 4, pp. 463-476.
Xu, W., and Südhof, T.C. (2013). A Neural Circuit for Memory Specificity and Generalization. Science 339, pp. 1290-1295.
O'Reilly, R.C., and Munakata, Y. (2000). Computational Explorations in Cognitive Neuroscience: Understanding the Mind by Simulating the Brain (Cambridge, MA, USA: MIT Press). ), Chapter 6, pp. 173-202 and Chapter 9, pp. 275-321.
R. Navawongse and H. Eichenbaum, "Distinct pathways for rule-based retrieval and spatial mapping of memory representations in hippocampal neurons," J. Neurosci., vol. 33, No. 3, pp. 1002-1013, 2013.
J. J. Hopfield, "Neural networks and physical systems with emergent collective computational abilities," Proc. Natl. Acad. Sci., vol. 79, No. 8, pp. 2554-2558, Apr. 1982.
T. Poggio, T. Serre, C. Tan, and S. Chikkerur, "An integrated model of visual attention using shape-based features," Jun. 2009, pp. 1-12.
T. Serre, L. Wolf, S. Bileschi, M. Riesenhuber, and T. Poggio, "Robust Object Recognition with Cortex-Like Mechanisms," IEEE Trans. Pattern Anal. Mach. Intell., vol. 29, No. 3, pp. 411-426, 2007.
R. C. O'Reilly and J. W. Rudy, "Conjunctive representations in learning and memory: Principles of cortical and hippocampal function," Psychol. Rev., vol. 108, No. 2, pp. 311-345, 2001.
G. J. Peters, C. N. David, M. D. Marcus, and D. M. Smith, "The medial prefrontal cortex is critical for memory retrieval and resolving interference," Learn. Mem., vol. 20, No. 4, pp. 201-209, 2013.
J. J. Hopfield, "Neurons with graded response have collective computational properties like those of two-state neurons," Proc. Natl. Acad. Sci., vol. 81, pp. 3088-3092, 1984.
O'Reilly, R.C., "The Leabra Model of Neural Interactions and Learning in the Neocortex," Phd Thesis, Carnegie Mellon University, Pittsburgh, PA, pp. 1-230, 1996.
Aisa, B., Mingus, B., and O'Reilly, R. (2008). The emergent neural modeling system. Neural Netw. Off. J. Int. Neural Netw. Soc. 21, pp. 1146-1152.
Amaral, D.G., and Witter, M.P. (1989). The three-dimensional organization of the hippocampal formation: a review of anatomical data. Neuroscience 31, pp. 571-591.
Anderson, M.C., Ochsner, K.N., Kuhl, B., Cooper, J., Robertson, E., Gabrieli, S.W., Glover, G.H., and Gabrieli, J.D.E. (2004). Neural systems underlying the suppression of unwanted memories. Science 303, pp. 232-235.
Aranda, L., Begega, A., Sánchez-López, J., Aguirre, J.A., Arias, J.L., and Santín, L.J. (2008). Temporary inactivation of the supramammillary area impairs spatial working memory and spatial reference memory retrieval. Physiol. Behav. 94, pp. 322-330.
Barnes, J.M., and Underwood, B.J. (1959). "Fate" of first-list associations in transfer theory. J. Exp. Psychol. 58, pp. 97-105.
Brun, V.H., Otnæss, M.K., Molden, S., Steffenach, H.-A., Witter, M.P., Moser, M.-B., and Moser, E.I. (2002). Place Cells and Place Recognition Maintained by Direct Entorhinal-Hippocampal Circuitry. Science 296, pp. 2243-2246.
Chawla, M.K., Guzowski, J.F., Ramirez-Amaya, V., Lipa, P., Hoffman, K.L., Marriott, L.K., Worley, P.F., McNaughton, B.L., and Barnes, C.A. (2005). Sparse, environmentally selective expression of Arc RNA in the upper blade of the rodent fascia dentata by brief spatial experience. Hippocampus 15, pp. 579-586.
Choi, W.K., Wirtshafter, D., Park, H.-J., Lee, M.-S., Her, S., and Shim, I. (2012). The characteristics of supramammillary cells

(56) References Cited

OTHER PUBLICATIONS projecting to the hippocampus in stress response in the rat. Korean J. Physiol. Pharmacol. Off. J. Korean Physiol. Soc. Korean Soc. Pharmacol. 16, pp. 17-24.

Deng, W. Mayford, M., and Gage, F.H. (2013). Selection of distinct populations of dentate granule cells in response to inputs as a mechanism for pattern separation in mice. eLife 2, pp. e00312.

Depue, B.E. Curran, T., and Banich, M.T. (2007). Prefrontal regions orchestrate suppression of emotional memories via a two-phase process. Science 317, pp. 215-219.

Doboli, S., Minai, A.A., and Best, P.J. (2000). Latent attractors: a model for context-dependent place representations in the hippocampus. Neural Comput. 12, pp. 1009-1043.

Douchamps, V., Jeewajee, A., Blundell, P., Burgess, N., and Lever, C. (2013). Evidence for encoding versus retrieval scheduling in the hippocampus by theta phase and acetylcholine. J. Neurosci. Off. J. Soc. Neurosci. 33, pp. 8689-8704.

Euston, D.R., Gruber, A.J., and McNaughton, B.L. (2012). The role of medial prefrontal cortex in memory and decision making. Neuron 76, pp. 1057-1070.

Gerraty, R.T., Davidow, J.Y., Wimmer, G.E., Kahn, I., and Shohamy, D. (2014). Transfer of Learning Relates to Intrinsic Connectivity between Hippocampus, Ventromedial Prefrontal Cortex, and Large-Scale Networks. J. Neurosci. 34, pp. 11297-11303.

Gould, E., Reeves, A.J., Graziano, M.S., and Gross, C.G. (1999). Neurogenesis in the neocortex of adult primates. Science 286, pp. 548-552.

Grossberg, S. (1976). Adaptive pattern classification and universal recoding: I. Parallel development and coding of neural feature detectors. Biol. Cybern. 23, pp. 121-134.

Hasselmo, M.E., Bodelón, C., and Wyble, B.P. (2002). A proposed function for hippocampal theta rhythm: separate phases of encoding and retrieval enhance reversal of prior learning. Neural Comput. 14, pp. 793-817.

Henze, D.A., Card, J.P., Barrionuevo, G., and Ben-Ari, Y. (1997). Large amplitude miniature excitatory postsynaptic currents in hippocampal CA3 pyramidal neurons are of mossy fiber origin. J. Neurophysiol. 77, pp. 1075-1086.

Hinton, G.E. (1989). Connectionist learning procedures. Artif. Intell. 40, pp. 185-234.

Javadi, A.H., and Walsh, V. (2012). Transcranial direct current stimulation (tDCS) of the left dorsolateral prefrontal cortex modulates declarative memory. Brain Stimulat. 5, pp. 231-241.

Jung, M.W., and McNaughton, B.L. (1993). Spatial selectivity of unit activity in the hippocampal granular layer. Hippocampus 3, pp. 165-182.

Kempermann, G., Kuhn, H.G., and Gage, F.H. (1997). More hippocampal neurons in adult mice living in an enriched environment. Nature 386, pp. 493-495.

Kempermann, G., Kuhn, H.G., and Gage, F.H. (1998). Experience-induced neurogenesis in the senescent dentate gyrus. J. Neurosci. Off. J. Soc. Neurosci. 18, pp. 3206-3212.

Kentros, C.G., Agnihotri, N.T., Streater, S., Hawkins, R.D., and Kandel, E.R. (2004). Increased attention to spatial context increases both place field stability and spatial memory. Neuron 42, pp. 283-295.

Van Kesteren, M.T.R., Ruiter, D.J., Fernández, G., and Henson, R.N. (2012). How schema and novelty augment memory formation. Trends Neurosci. 35, pp. 211-219.

Ketz, N., Morkonda, S.G., and O'Reilly, R.C. (2013). Theta Coordinated Error-Driven Learning in the Hippocampus. PLoS Comput Biol 9, pp. e1003067.

Kim, J., Delcasso, S., and Lee, I. (2011). Neural correlates of object-in-place learning in hippocampus and prefrontal cortex. J. Neurosci. Off. J. Soc. Neurosci. 31, pp. 16991-17006.

Kubie, J.L., and Muller, R.U. (1991). Multiple representations in the hippocampus. Hippocampus 1, pp. 240-242.

Kuhn, H.G., Dickinson-Anson, H., and Gage, F.H. (1996). Neurogenesis in the dentate gyrus of the adult rat: age-related decrease of neuronal progenitor proliferation. J. Neurosci. Off. J. Soc. Neurosci. 16, pp. 2027-2033.

Kunec, S., Hasselmo, M.E., and Kopell, N. (2005). Encoding and retrieval in the CA3 region of the hippocampus: a model of theta-phase separation. J. Neurophysiol. 94, pp. 70-82.

Leutgeb, J.K., Leutgeb, S., Moser, M.-B., and Moser, E.I. (2007). Pattern Separation in the Dentate Gyrus and CA3 of the Hippocampus. Science 315, pp. 961-966.

Leutgeb, S., Leutgeb, J.K., Treves, A., Moser, M.-B., and Moser, E.I. (2004). Distinct ensemble codes in hippocampal areas CA3 and CA1. Science 305, pp. 1295-1298.

Leutgeb, S., Leutgeb, J.K., Barnes, C.A., Moser, E.I., McNaughton, B.L., and Moser, M.-B. (2005). Independent codes for spatial and episodic memory in hippocampal neuronal ensembles. Science 309, pp. 619-623.

Luu, P., Sill, O.C., Gao, L., Becker, S., Wojtowicz, J.M., and Smith, D.M. (2012). The role of adult hippocampal neurogenesis in reducing interference. Behav. Neurosci. 126, pp. 381-391.

Markus, E.J., Qin, Y.L., Leonard, B., Skaggs, W.E., McNaughton, B.L., and Barnes, C.A. (1995). Interactions between location and task affect the spatial and directional firing of hippocampal neurons. J. Neurosci. Off. J. Soc. Neurosci. 15, pp. 7079-7094.

Marr, D. (1971). Simple memory: a theory for archicortex. Philos. Trans. R. Soc. Lond. B. Biol. Sci. 262, pp. 23-81.

McClelland, J.L., McNaughton, B.L., and O'Reilly, R.C. (1995). Why there are complementary learning systems in the hippocampus and neocortex: insights from the successes and failures of connectionist models of learning and memory. Psychol. Rev. 102, pp. 419.

McNaughton, B.L., and Morris, R.G.M. (1987). Hippocampal synaptic enhancement and information storage within a distributed memory system. Trends Neurosci. 10, pp. 408-415.

Miller, E.K., and Cohen, J.D. (2001). An Integrative Theory of Prefrontal Cortex Function. Annu. Rev. Neurosci. 24, pp. 167-202.

Muzzio, I.A., Levita, L., Kulkarni, J., Monaco, J., Kentros, C., Stead, M., Abbott, L.F., and Kandel, E.R. (2009a). Attention enhances the retrieval and stability of visuospatial and olfactory representations in the dorsal hippocampus. PLoS Biol. 7, pp. e1000140.

Muzzio, I.A., Kentros, C., and Kandel, E. (2009b). What is remembered? Role of attention on the encoding and retrieval of hippocampal representations. J. Physiol. 587, pp. 2837-2854.

Naber, P.A., Lopes da Silva, F.H., and Witter, M.P. (2001). Reciprocal connections between the entorhinal cortex and hippocampal fields CA1 and the subiculum are in register with the projections from CA1 to the subiculum. Hippocampus 11, pp. 99-104.

Office Action 1 for U.S. Appl. No. 14/671,049, dated Aug. 10, 2017.

Ogata, et al., Extracting Multi-Modal Dynamics of Objects using RNNPB, 2005 IEEE/RSJ International Conference on Intelligent Robots and Systems, 2005, pp. 160-165.

Response to Office Action 1 for U.S. Appl. No. 14/671,049, dated Nov. 8, 2017.

Office Action 2 for U.S. Appl. No. 14/671,049, dated Mar. 16, 2018.

\* cited by examiner

| Projections | Proj. spec. | Rnd | Weight Scale | Irate |
|---|---|---|---|---|
| Memory Input → ECin | Full | 1.0 mean, 0.0 var | Abs=1, rel=1 | 0 |
| ECin → DG, CA3, CA1 | Random 25% | | Abs=10, rel=3.33 | |
| DG → CA3 | Random 4% | 0.5 mean, 0.25 var | Abs=1, rel=2 | 0.01 |
| CA3 recursive | Full | | Abs=5, rel=1 | |
| CA3 → CA1 | | | | |
| ECout → ECin | | | Abs=1, rel=0.5 | |

SIMULATION

DATA

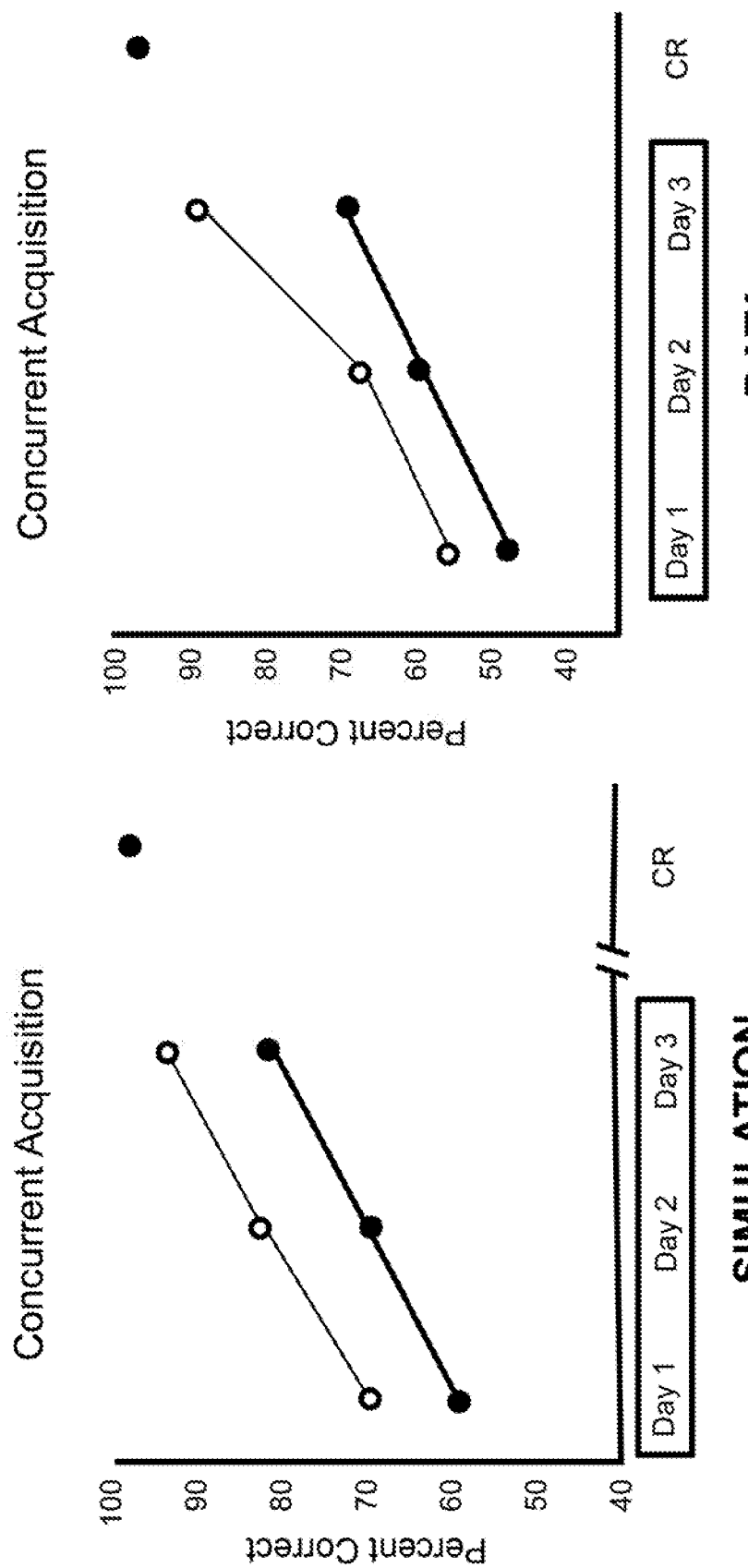
FIG. 13A SIMULATION
FIG. 13B DATA

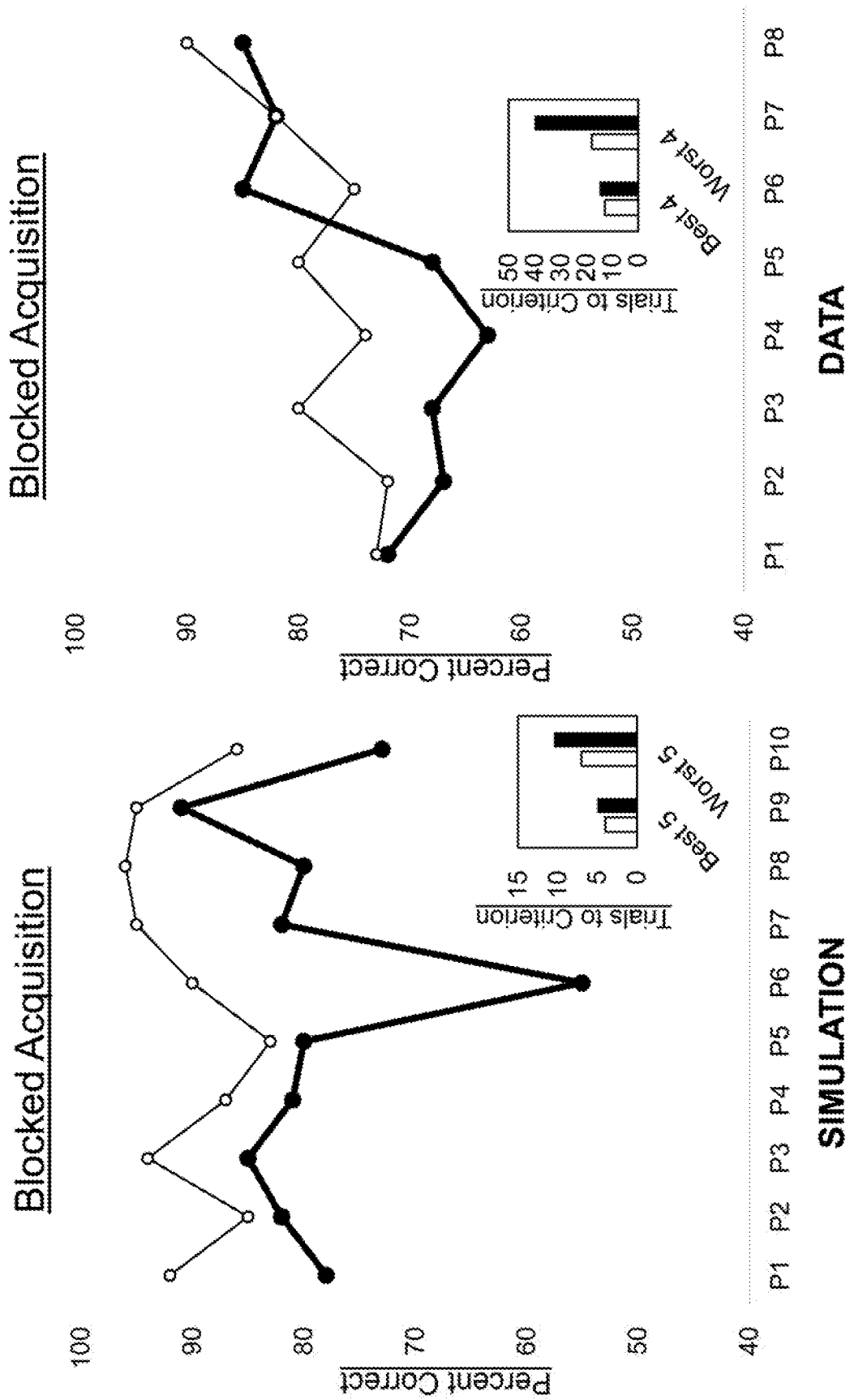
FIG. 14A SIMULATION
FIG. 14B DATA

DATA

SIMULATION

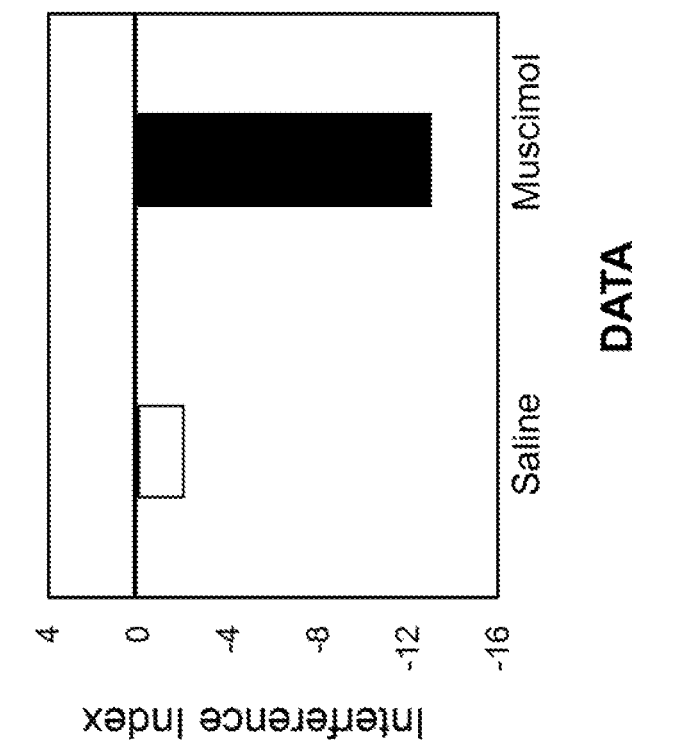
FIG. 15D DATA
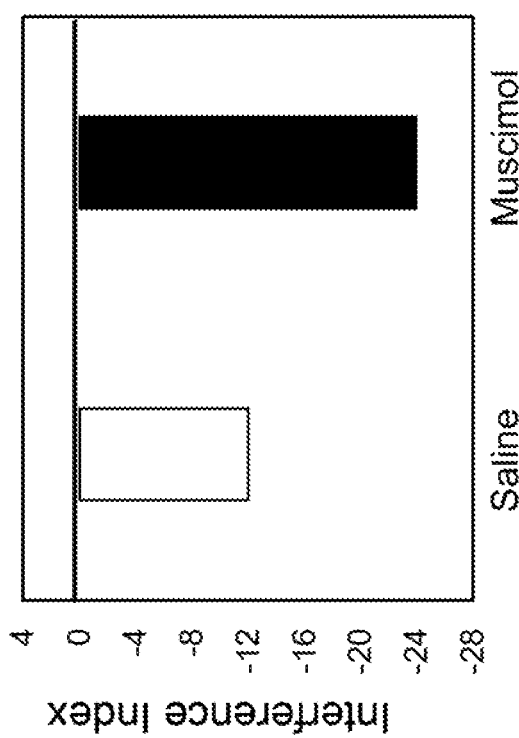
FIG. 15C SIMULATION

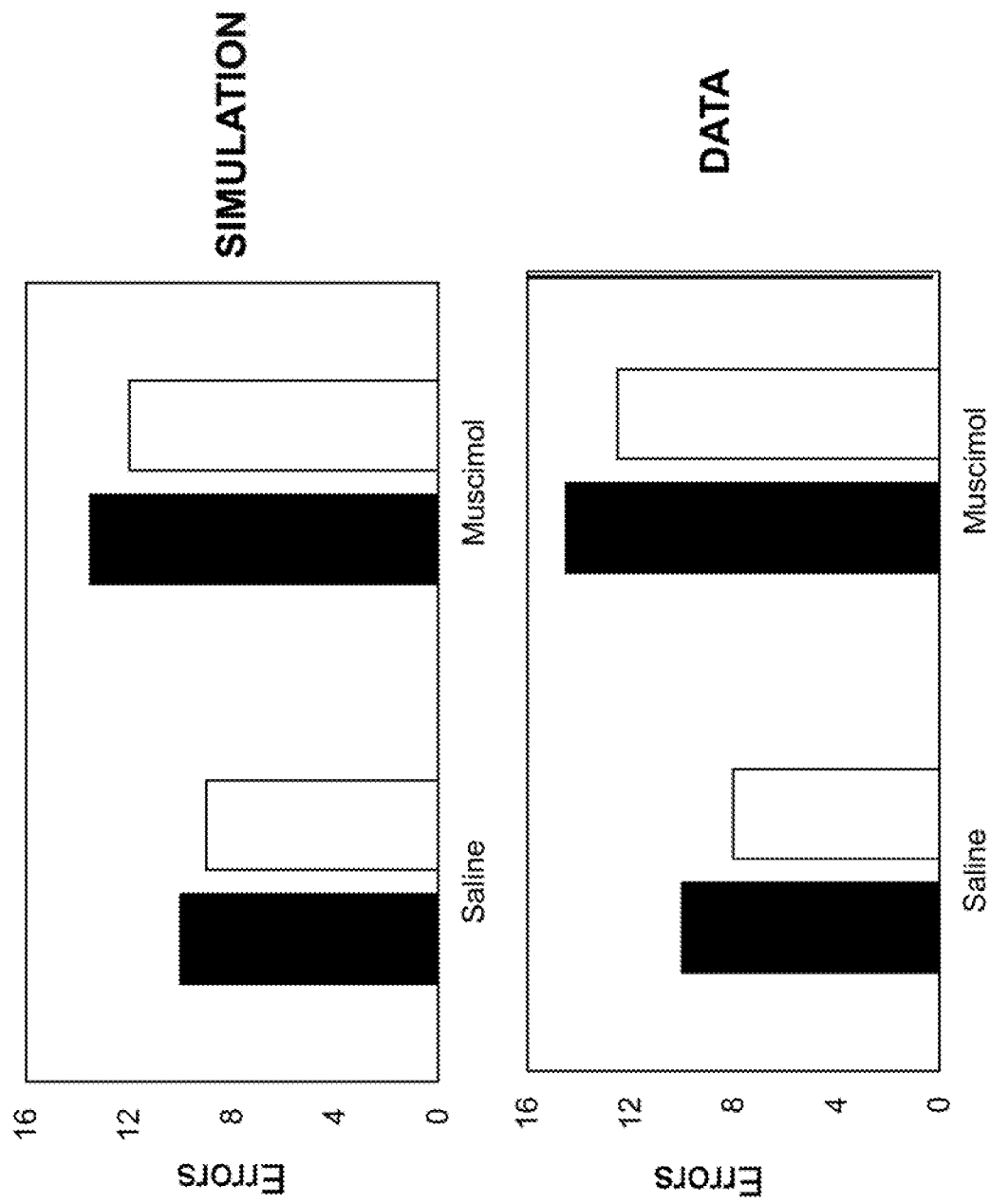

DATA

SIMULATION

DATA

SIMULATION

| Parameter | Equation | EC (II/III, V/VI) | DG | CA3, CA1 |
|---|---|---|---|---|
| $\bar{g}_l$ | 2 | 0.1 | 0.1 | 0.1 |
| $\bar{g}_e$ | 2 | 1 | 1 | 1 |
| $\bar{g}_i$ | 2 | 1 | 1 (relevant) 5 (irrelevant) | 1 |
| $(\Upsilon, \Theta)$ | 4 | (100, 0.5) | (100, 0.5) | (100, 0.5) |
| $(E_l, E_e, E_i)$ | 2 | (0.3, 1, 0.25) | (0.3, 1, 0.25) | (0.3, 1, 0.25) |
| $V_{rest}$ | 2 | 0.3 | 0.3 | 0.3 |
| $q$ | 5 | 0.25 | 0.25 | 0.25 |
| k in k-WTA | 5 | 25% | 1% | 2.5% |
| $dt$ (in sec) | 2 | 0.001 | 0.001 | 0.001 |
| $V_m$ range | 2 | 0-2 | 0-2 | 0-2 |

FIG. 17

| Projection | Connection probability | $k_{hebb}$ (Eq. 6) | Weight scale (absolute, relative) |
|---|---|---|---|
| EC II/III → DG (perforant path) | p = 0.25 | 1 | (1, 1) |
| EC II/III → CA3 (perforant path) | p = 0.25 | 1 | (1, 1) |
| EC II/III → CA1 (perforant path) | p = 0.25 | 0.05 | (1, 1) |
| DG → CA3 (Mossy fibers) | p = 0.04 | 1 | (10, 3.5) |
| CA3 → CA1 (Schaffer collaterals) | full | 1 | (5, 1) |
| CA3 → CA3 (recurrent collaterals) | full | 0.05 | (1, 2) |
| CA1 → EC V/VI (backprojections) | full | 0.05 | (1, 1) |
| EC V/VI → EC II/III (intracortical) | one-to-one | 1 | (1, 0.5) |

FIG. 18

| Sub-region | Rat data | Human data | Model |
|---|---|---|---|
| EC layers II/II | 360,000 = 14.0% | 4,320,000 = 11.6% | 24x3 = 3.3% |
| EC layers V/VI | 330,000 = 12.8% | 3,780,000 = 10.2% | 24x3 = 3.3% |
| DG | 1,250,000 = 48.4% | 12,230,000 = 32.9% | 300x4 = 54.3% |
| CA3 | 250,000 = 9.7% | 2,830,000 = 7.6% | 240 = 10.9% |
| CA1 | 390,000 = 15.1% | 14,000,000 = 37.7% | 384 = 17.4% |

FIG. 19

PREFRONTAL MODULATION OF CONTEXT-SPECIFIC MEMORY ENCODING AND RETRIEVAL IN THE HIPPOCAMPUS

CROSS-REFERENCE TO RELATED APPLICATIONS

This is a Continuation-in-Part application of U.S. Non-Provisional application Ser. No. 14/671,049, filed on Mar. 27, 2015, entitled "A Contextually Biased Memory System Simulating Human Performance," which is a Non-Provisional Application that claims the benefit of U.S. Provisional Patent Application No. 61/972,086, filed on Mar. 28, 2014, entitled, "A Contextually Biased Memory System Simulating Human Performance," which are incorporated herein by reference in their entirety.

This application is ALSO a Non-Provisional application of U.S. Provisional Patent Application No. 62/145,200, filed on Apr. 9, 2015, entitled "Prefrontal Modulation of Context-Specific Memory Encoding and Retrieval in the Hippocampus," which is incorporated herein by reference in its entirety.

GOVERNMENT LICENSE RIGHTS

This invention was made with government support under U.S. Government Contract Number Contract # DIOPC20021. The government has certain rights in the invention.

BACKGROUND OF THE INVENTION

(1) Field of Invention

The present invention relates to a memory system for encoding and retrieving memories and, more particularly, to a memory system for encoding and retrieving memories in context.

(2) Description of Related Art

A defining characteristic of our daily lives is our ability to recall memories of experiences that occurred in arbitrary places, even from the distant past. Many times actions or decisions that are appropriate in one context are inappropriate in a different context. That means that humans (and machines that have memory components) must store conflicting memories for each context. There has been a tremendous increase in recent advances in the understanding of human cognition down to a neural level.

It has long been known that the hippocampus is critical for the formation of long-term declarative memories. Its main function is to rapidly bind together multi-modal cortical signals representing a current event into memory engrams, such that a partial cue presented later can trigger the reactivation of the corresponding engrams and thereby the episodic memory recall (see the List of Incorporated Literature References, Literature Reference Nos. 45 and 66). Also, distributed regions beyond the hippocampus are known to be involved in memory processing, such as the prefrontal cortex (PFC), but their roles are computationally less clear.

Thus, a continuing need exists for a system that demonstrates how PFC modulates various aspects of memory processing and behavior.

SUMMARY OF THE INVENTION

The present invention relates to memory system for encoding and retrieving memories and, more particularly, to a memory system for encoding and retrieving memories in context. The system comprises one or more processors and a non-transitory computer-readable medium having executable instructions encoded thereon such that when executed, multiple operations are performed. The system encodes a memory formed for a given context in a neural model of the entorhinal-hippocampal system, forming a context-appropriate memory. The context-appropriate memory is comprised of an association between presented environmental cues and presence of a rewarded event. The system discriminates between environmental cues in an environment surrounding a vehicle and retrieves at least one encoded context-appropriate memory. The system uses the at least one retrieved encoded context-appropriate memory to determine whether to initiate a collision avoidance operation to cause the vehicle to proactively avoid a collision.

In another aspect, if the same environmental cue is presented across more than one context, different associations can be learned in different contexts.

In another aspect, discrimination between environmental cues occurs even if the environmental cues have only been presented in a single context.

In another aspect, the system dynamically facilitates only a subset of a set of neural units of the neural model to represent various memories within a particular context.

In another aspect, the neural model is used to guide targeted neuromodulation to improve memory function.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is a table illustrating network configuration as implemented in an emergent network simulation according to the principles of the present invention;

FIG. 13A illustrates results of the model simulation related to the effects of mPFC inactivation on the concurrent acquisition of multiple odor discrimination memories according to embodiments of the present disclosure;

FIG. 13B illustrates data related to the effects of mPFC inactivation on the concurrent acquisition of multiple odor discrimination memories according to prior art;

FIG. 14A illustrates results of the model simulation related to the effects of mPFC inactivation on the blocked acquisition of several memories one at a time according to embodiments of the present disclosure;

FIG. 14B illustrates data related to the effects of mPFC inactivation on the blocked acquisition of several memories one at a time according to prior art;

FIG. 15C illustrates results of the model simulation related to the amount of interference from List 1 on the acquisition on List 2 memories in the different context according to embodiments of the present disclosure;

FIG. 15D illustrates data related to the amount of interference from List 1 on the acquisition on List 2 memories in the different context according to prior art;

FIG. 15E illustrates results of the model simulation related to the overall number of preservative and non-preservative errors in the discriminative choices while acquiring List 2 memories according to embodiments of the present disclosure;

FIG. 15F illustrates data related to the overall number of preservative and non-preservative errors in the discriminative choices while acquiring List 2 memories according to prior art;

FIG. 17 is a table of values for various parameters in each sub-region within the model that were used to simulate the experimental data related to the effects of mPFC inactivation on memory encoding and recall behavior according to embodiments of the present disclosure;

FIG. 18 is a table of the types of connectivity among various sub-regions within the model according to embodiments of the present disclosure; and FIG. 19 is a table of relative sizes of various sub-regions within the model according to embodiments of the present disclosure.

DETAILED DESCRIPTION

Figure 1:
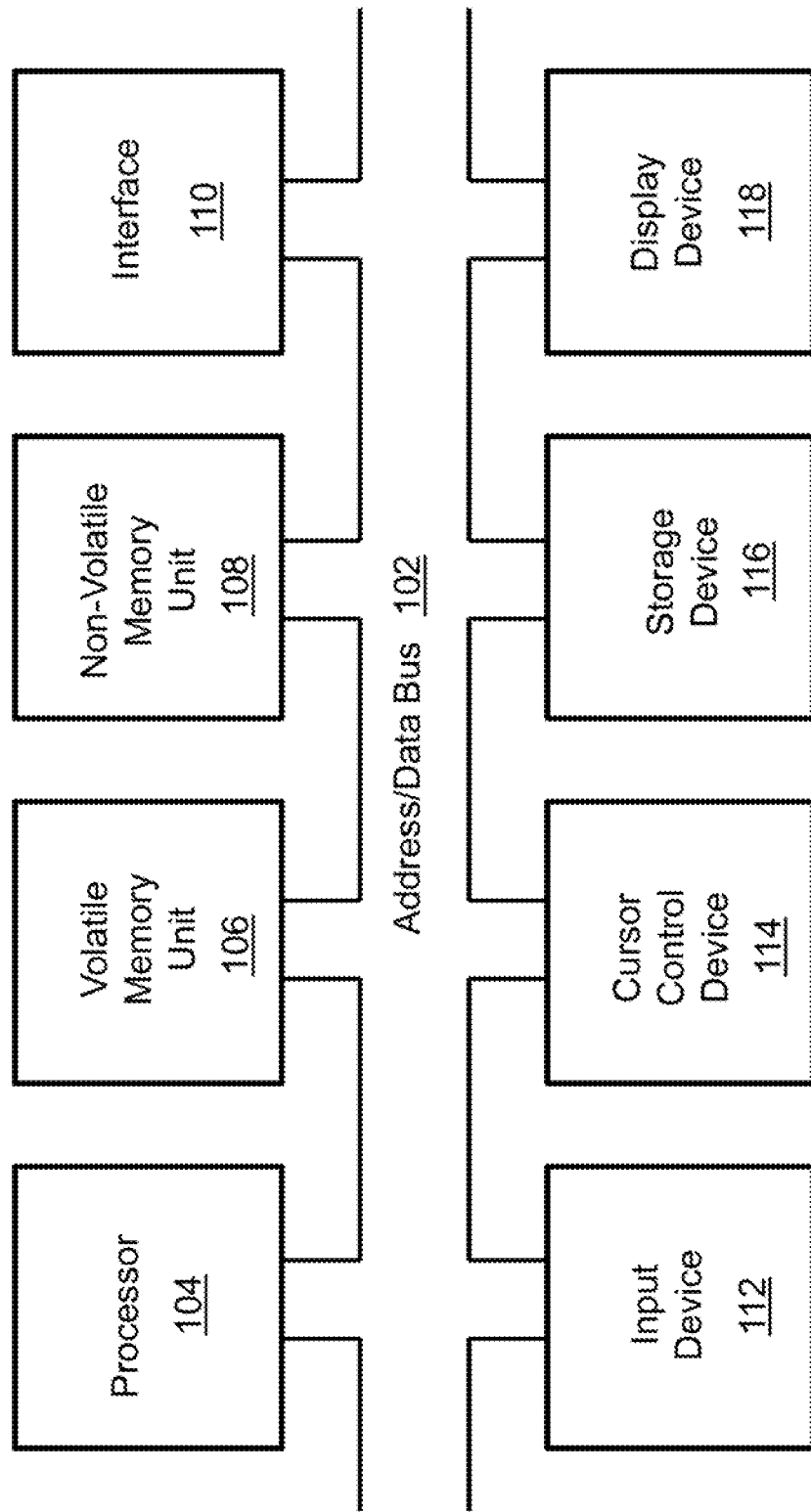
FIG. 1 is a block diagram depicting the components of a system for storing and retrieving memories in context according to the principles of the present invention.

The present invention relates to a memory system for encoding and retrieving memories and, more particularly, to a memory system for encoding and retrieving memories in context. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set fbrth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. R. Navawongse and H. Eichenbaum, "Distinct pathways for rule-based retrieval and spatial mapping of memory representations in hippocampal neurons," J. Neurosci., vol. 33, no. 3, pp. 1002--1013, 2013.
2. J. J. Hopfield, "Neural networks and physical systems with emergent collective computational abilities," Proc. Natl. Acad. Sci., vol. 79, no. 8, pp. 2554-2558, April 1982.
3. T. Poggio, T. Serre, C. Tan, and S. Chikkerur, "An integrated model of visual attention using shape-based features," June 2009.
4. T. Serre, L. Wolf, S. Bileschi, M. Riesenhuber, and T. Poggio, "Robust Object Recognition with Cortex-Like Mechanisms," IEEE Trans. Pattern Anal. Mach. Intell., vol. 29, no. 3, pp. 411-426, 2007.
5. R. C. O'Reilly and J. W. Rudy, "Conjunctive representations in learning and memory: Principles of cortical and hippocampal function," Psychol. Rev., vol. 108, no. 2, pp. 311-345, 2001.
6. G. J. Peters, C. N. David, M. D. Marcus, and D. M. Smith, "The medial prefrontal cortex is critical for memory retrieval and resolving interference," Learn. Mem., vol. 20, no. 4, pp. 201-209, 2013.
7. J. J. Hopfield, "Neurons with graded response have collective computational properties like those of two-state neurons," Proc. Natl. Acad. Sci., vol. 81, pp. 3088-3092, 1984.
8. O'Reilly, R. C., "The Leabra Model of Neural Interactions and Learning in the Neocortex," Phd Thesis, Carnegie Mellon University, Pittsburgh, Pa., 1996.
9. Aisa, B., Mingus, B., and O'Reilly, R. (2008). The emergent neural modeling system. Neural Netw. Off. J. Int. Neural Netw. Soc. 21, 1146-1152.
10. Amaral, D. G., and Witter, M. P. (1989). The three-dimensional organization of the hippocampal formation: a review of anatomical data. Neuroscience 31, 571-591.
11. Anderson, M. C., Ochsner, K. N., Kuhl, B., Cooper, J., Robertson, E., Gabrieli, S. W., Glover, G. H., and Gabrieli, J. D. E. (2004). Neural systems underlying the suppression of unwanted memories. Science 303, 232-235.
12. Aranda, L., Begega, A., Sánchez-López, J., Aguirre, J. A., Arias, J. L., and Santin, L. J. (2008). Temporary inactivation of the supramammillary area impairs spatial working memory and spatial reference memory retrieval. Physiol. Behav, 94, 322-330.
13. Barnes, J. M., and Underwood, B. J. (1959). "Fate" of first-list associations in transfer theory. J. Exp. Psychol. 58, 97-105.
14. Brun, V. H., Otnass, M. K., Molden, S., Steffenach, H.-A., Witter, M. P., Moser, M.-B., and Moser, E. I. (2002). Place Cells and Place Recognition Maintained by Direct Entorhinal-Hippocampal Circuitry. Science 296, 2243-2246.
15. Chawla, M. K., Guzowski, J. F., Ramirez-Amaya, V., Lipa, P., Hoffman, K. L., Marriott, L. K., Worley, P. F., McNaughton, B. L., and Barnes, C. A. (2005). Sparse, environmentally selective expression of Arc RNA in the upper blade of the rodent fascia dentata by brief spatial experience. Hippocampus 15, 579-586.
16. Choi, W. K., Wirtshafter, D., Park, H.-J., Lee, M.-S., Her, S., and Shim, I. (2012). The characteristics of supramammillary cells projecting to the hippocampus in stress response in the rat. Korean J. Physiol. Pharmacol. Off. J. Korean Physiol. Soc. Korean Soc. Pharmacol. 16, 17-24.
17. Deng, W., Mayford, M., and Gage, F. H. (2013). Selection of distinct populations of dentate granule cells in response to inputs as a mechanism for pattern separation in mice. eLife 2, e00312.
18. Depue, B. E., Curran, T., and Banich, M. T. (2007). Prefrontal regions orchestrate suppression of emotional memories via a two-phase process. Science 317, 215-219.
19. Doboli, S., Minai, A. A., and Best, P. J. (2000). Latent attractors: a model for context-dependent place representations in the hippocampus. Neural Comput. 12, 1009-1043.
20. Douchamps, V., Jeewajee, A., Blundell, P., Burgess, N., and Lever, C. (2013). Evidence for encoding versus retrieval scheduling in the hippocampus by theta phase and acetylcholine. J. Neurosci. Off. J. Soc. Neurosci. 33, 8689-8704.
21. Euston, D. R., Gruber, A. J., and McNaughton, B. L. (2012). The role of medial prefrontal cortex in memory and decision making. Neuron 76, 1057-1070.
22. Gerraty, R. T., Davidow, J. Y., Wimmer, G. E., Kahn, I., and Shohamy, D. (2014). Transfer of Learning Relates to Intrinsic Connectivity between Hippocampus, Ventromedial Prefrontal Cortex, and Large-Scale Networks. J. Neurosci. 34, 11297-11303.
23. Gould, E., Reeves, A. J., Graziano, M. S., and Gross, C. G. (1999). Neurogenesis in the neocortex of adult primates. Science 286, 548-552.

24. Grossberg, S. (1976). Adaptive pattern classification and universal recoding: I. Parallel development and coding of neural feature detectors. Biol. Cybern. 23, 121-134.
25. Hasselmo, M. E., Bodelón, C., and Wyble, B. P. (2002). A proposed function for hippocampal theta rhythm: separate phases of encoding and retrieval enhance reversal of prior learning. Neural Comput. 14, 793-817.
26. Henze, D. A., Card, J. P., Barrionuevo, G., and Ben-Ari, Y. (1997). Large amplitude miniature excitatory postsynaptic currents in hippocampal CA3 pyramidal neurons are of mossy fiber origin. J. Neurophysiol. 77, 1075-1086.
27. Hinton, G. E. (1989). Connectionist learning procedures. Artif. Intell. 40, 185-234.
28. Javadi, A. H., and Cheng, P. (2012). Transcranial direct current stimulation (tDCS) enhances reconsolidation of long-term memory. Brain Stimulat.
29. Javadi, A. H., and Walsh, V. (2012). Transcranial direct current stimulation (tDCS) of the left dorsolateral prefrontal cortex modulates declarative memory. Brain Stimulat. 5, 231-241.
30. Jung, M. W., and McNaughton, B. L. (1993). Spatial selectivity of unit activity in the hippocampal granular layer. Hippocampus 3, 165-182.
31. Kempermann, G., Kuhn, H. G., and Gage, F. H. (1997). More hippocampal neurons in adult mice living in an enriched environment. Nature 386, 493-495.
32. Kempermann, G., Kuhn, H. G., and Gage, F. H. (1998). Experience-induced neurogenesis in the senescent dentate gyrus. J. Neurosci. Off. J. Soc. Neurosci. 18, 3206-3212.
33. Kentros, C. G., Agnihotri, N. T., Streater, S., Hawkins, R. D., and Kandel, E. R. (2004). Increased attention to spatial context increases both place field stability and spatial memory. Neuron 42, 283-295.
34. Van Kesteren, M. T. R., Ruiter, D. J., Fernmndez, G., and Henson, R. N. (2012). How schema and novelty augment memory formation. Trends Neurosci. 35, 211-219.
35. Ketz, N., Morkonda. S. G., and O'Reilly, R. C. (2013). Theta Coordinated Error-Driven Learning in the Hippocampus. PLoS Comput Biol 9, e1003067.
36. Kim, J., Delcasso, S., and Lee, I. (2011). Neural correlates of object-in-place learning in hippocampus and prefrontal cortex. J. Neurosci. Off. J. Soc. Neurosci. 31, 16991-17006.
37. Kubie, J. L., and Muller, R. U. (1991). Multiple representations in the hippocampus. Hippocampus 1, 240-242.
38. Kuhn, H. G., Dickinson-Anson, H., and Gage, F. H. (1996). Neurogenesis in the dentate gyrus of the adult rat: age-related decrease of neuronal progenitor proliferation. J. Neurosci. Off. J. Soc. Neurosci. 16, 2027-2033.
39. Kunec, S., Hasselmo, M. E., and Kopell, N. (2005). Encoding and retrieval in the CA3 region of the hippocampus: a model of theta-phase separation. J. Neurophysiol. 94, 70-82.
40. Leutgeb, J. K., Leutgeb, S., Moser, M.-B., and Moser, E. I. (2007). Pattern Separation in the Dentate Gyrus and CA3 of the Hippocampus. Science 315, 961-966.
41. Leutgeb, S., Leutgeb, J. K., Treves, A., Moser, M.-B., and Moser, E. I. (2004). Distinct ensemble codes in hippocampal areas CA3 and CA1. Science 305, 1295-1298.
42. Leutgeb, S., Leutgeb, J. K., Barnes, C. A., Moser, E. I., McNaughton, B. L., and Moser, M.-B. (2005). Independent codes for spatial and episodic memory in hippocampal neuronal ensembles. Science 309, 619-623.
43. Luu, P., Sill, O. C., Gao, L., Becker, S., Wojtowicz, J. M., and Smith, D. M. (2012). The role of adult hippocampal neurogenesis in reducing interference. Behav. Neurosci. 126, 381-391.
44. Markus, E. J., Qin, Y. L., Leonard, B., Skaggs, W. E., McNaughton, B. L., and Barnes, C. A. (1995). Interactions between location and task affect the spatial and directional firing of hippocampal neurons. J. Neurosci. Off. J. Soc. Neurosci. 15, 7079-7094.
45. Marr, D. (1971). Simple memory: a theory for archicortex. Philos. Trans. R. Soc. Lond. B. Biol. Sci. 262, 23-81.
46. McClelland, J. L., McNaughton, B. L., and O'Reilly, R. C. (1995). Why there are complementary learning systems in the hippocampus and neocortex: insights from the successes and failures of connectionist models of learning and memory. Psychol. Rev. 102, 419.
47. McNaughton, B. L., and Morris, R. G. M. (1987). Hippocampal synaptic enhancement and information storage within a distributed memory system. Trends Neurosci. 10, 408-415.
48. Miller, E. K., and Cohen, J. D. (2001). An Integrative Theory of Prefrontal Cortex Function. Annu. Rev. Neurosci. 24, 167-202.
49. Muzzio, L A., Levita, L., Kulkarni, J., Monaco, J., Kentros, C., Stead, M., Abbott, L. F., and Kandel, E. R. (2009a). Attention enhances the retrieval and stability of visuospatial and olfactory representations in the dorsal hippocampus. PLoS Biol. 7, e1000140.
50. Muzzio, I. A., Kentros, C., and Kandel, E. (2009b). What is remembered?Role of attention on the encoding and retrieval of hippocampal representations. J. Physiol. 587, 2837-2854.
51. Naber, P. A., Lopes da Silva, F. H., and Witter, M. P. (2001). Reciprocal connections between the entorhinal cortex and hippocampal fields CA1 and the subiculum are in register with the projections from CA1 to the subiculum. Hippocampus 11, 99-104.
52. Nakanishi, K., Saito, H., and Abe, K. (2001). The supramammillary nucleus contributes to associative EPSP-spike potentiation in the rat dentate gyrus in vivo. Eur. J. Neurosci. 13, 793-800.
53. Nakazawa, K., Quirk, M. C., Chitwood, R. A., Watanabe, M., Yeckel, M. F., Sun, L. D., Kato, A., Carr, C. A., Johnston, D., Wilson, M. A., et al. (2002). Requirement for hippocampal CA3 NMDA receptors in associative memory recall. Science 297, 211-218.
54. Navawongse, R., and Eichenbaum, H. (2013). Distinct pathways for rule-based retrieval and spatial mapping of memory representations in hippocampal neurons. J. Neurosci. Off. J. Soc. Neurosci. 33, 1002-1013.
55. O'Reilly, R. C. (2004). The Division of Labor Between the Neocortex and Hippocampus. In Connectionist Modeling in Cognitive Psychology, G. Houghton, ed. (Psychology Press), p. 488.
56. O'Reilly, R. C., and Munakata, Y. (2000). Computational Explorations in Cognitive Neuroscience: Understanding the Mind by Simulating the Brain (Cambridge, Mass., USA: MIT Press).

57. O'Reilly, R. C., and Rudy, J. W. (2001). Conjunctive representations in learning and memory: Principles of cortical and hippocampal function. Psychol. Rev. 108, 311-345.
58. O'Reilly, R. C., Bhattacharyya, R., Howard, M. D., and Ketz, N. (2014). Complementary Learning Systems. Cogn. Sci. 38, 1229-1248.
59. Peters, G. J., David, C. N., Marcus, M. D., and Smith, D. M. (2013). The medial prefrontal cortex is critical for memory retrieval and resolving interference. Learn. Mem. Cold Spring Harb. N 20, 201-209.
60. Ramirez, S., Liu, X., Lin, P.-A., Sub, J., Pignatelli, M., Redondo, R. L., Ryan, T. J., and Tonegawa, S. (2013). Creating a False Memory in the Hippocampus. Science 341, 387-391.
61. Rumelhart, D. E., and Zipser, D. (1986). Parallel Distributed Processing: Explorations in the Microstructure of Cognition, Vol. 1. D. E. Rumelhart, J. L. McClelland, and C. PDP Research Group, eds. (Cambridge, Mass., USA: MIT Press), pp. 151-193.
62. Schmidt, B., Marrone, D. F., and Markus, E. J. (2012). Disambiguating the similar: The dentate gyrus and pattern separation. Behav. Brain Res. 226, 56-65.
63. Shahidi, S., Motamedi, F., and Naghdi, N. (2004). Effect of reversible inactivation of the supramammillary nucleus on spatial learning and memory in rats. Brain Res. 1026, 267-274.
64. Squire, L. R., and Alvarez, P. (1995). Retrograde amnesia and memory consolidation: a neurobiological perspective. Curr. Opin. Neurobiol. 5, 169-177.
65. Thompson, L. T., and Best, P J. (1989). Place cells and silent cells in the hippocampus of freely-behaving rats. J. Neurosci. Off. J. Soc. Neurosci. 9, 2382-2390.
66. Treves, A., and Rolls, E. T. (1994). Computational analysis of the role of the hippocampus in memory. Hippocampus 4, 374-391.
67. Vertes, R. P. (2004). Differential projections of the infralimbic and prelimbic cortex in the rat. Synap. N. Y. N 51, 32-58.
68. Vertes, R. P., and McKenna, J. T. (2000). Collateral projections from the supramammillary nucleus to the medial septum and hippocampus. Synap. N. Y. N 38, 281-293.
69. Vertes, R. P., Hoover, W. B., Szigeti-Buck, K., and Leranth, C. (2007). Nucleus reuniens of the midline thalamus: link between the medial prefrontal cortex and the hippocampus. Brain Res. Bull. 71, 601-609.
70. Weel, M. J. D.-V. der, Silva, F. H. L. da, and Witter, M. P. (1997). Nucleus Reuniens Thalami Modulates Activity in Hippocampal Field CA1 through Excitatory and Inhibitory Mechanisms. J. Neurosci. 17, 5640-5650.
71. Wimber, M., Btiuml, K.-H., Bergström, Z., Markopoulos, G., Heinze, H.-J., and Richardson-Klavehn, A. (2008). Neural markers of inhibition in human memory retrieval. J. Neurosci. Off. J. Soc. Neurosci. 28, 13419-13427.
72. Wyss, J. M., Swanson, L. W., and Cowan, W. M. (1979). A study of subcortical afferents to the hippocampal formation in the rat. Neuroscience 4, 463-476.
73. Xu, W., and Südhof, T. C. (2013). A Neural Circuit for Memory Specificity and Generalization. Science 339, 1290-1295.

(2) PRINCIPAL ASPECTS

The present invention has three "principal" aspects. The first is a system for encoding and retrieving memories in context. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
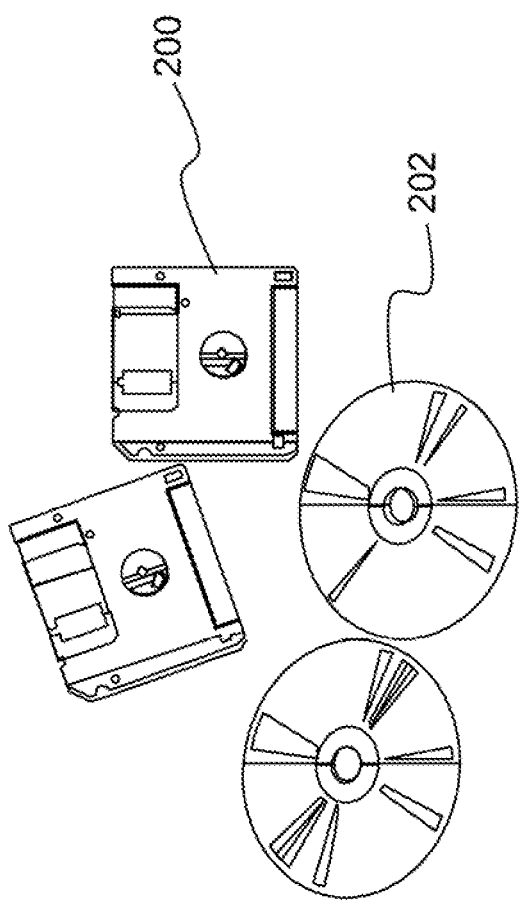
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Described is a memory system capable of storing memories "in context". Memory is distinguished from context by defining a memory as features or attributes of salient task relevant aspects of sensory experience, whereas context is more of a gist, or impression, of the environment in which those memory features are experienced. Thus, context is composed of the sum of all non-salient aspects that are unimportant to remember in detail, but nonetheless are part of sensory (but subconscious) experience, and may be used to distinguish between similar (but conflicting) memories that occur in different contexts. The system according to the principles of the present invention models the way the brain handles this, as a top-down inhibitory bias on the cued recall. This is a novel way to encode memories and/or retrieve them. In addition, embodiments of the present invention offer a way to defer the decision about what it is about a context that is relevant to the decision or action being memorized.

Many times actions or decisions that are appropriate in one context are inappropriate in a different context. That means that humans (and machines that have memory components) must store conflicting memories for each context. As a non-limiting example, one learns that at work there is a certain dress code and a rather circumspect way of acting. However, at a party, there is an entirely different style of dressing and a much less guarded way of acting. The cues for choosing how to dress may be the same: it is time to dress for the occasion. However, the context is different. A party context does not have certain attributes, but it does have a gist, or impression, formed by attending many parties. For instance, one may anticipate having fun with friends. The context influences a person's choices when choosing clothes, but decisions are different for a party vs. going to work. Note that since the context is a gist, it is unlikely that it is known exactly what features of the context are important at first. For example, the day of the work week may not seem relevant at first, but at a workplace with casual Friday, the day of the week is an important feature.

Another example is a rat experiment where there are two rooms, referred to as A and B, each with two dishes called X and Y distinguished only by their scent. The rooms have no distinguishing features beyond the sense of location that the rat gets by moving freely between the rooms. The rats are allowed to freely forage in the two rooms, which are close to one another, and they find that in room A, dish X contains a bit of food (but not in dish Y). In room B they find a bit of food in dish Y (but not dish X). In experiments described in Literature Reference No. 1, the rats learned very quickly to go directly to the dish with the food in each room. They learned that when they see an X and a Y in context A, X contains food. However, if they see the same X and Y in context B, the Y dish contains food.

In one aspect, the present invention is a model of how the human brain remembers things in order to model human performance in behavioral tasks, which has many useful applications. In another aspect, the system according to the principles of the present invention is an improvement on prior art in content addressable memory (CAM) systems, which typically cannot store a memory in context without explicitly storing additional information. Thus, embodiments the system described herein has better capacity because less space is required to store the same and/or key information. In a third aspect, the present invention offers the ability to defer identification of what it is about the context that is important to the decision or action being encoded. When first encoded, the context is by definition non-salient and amorphous. Therefore, if the context were associated with the memory directly by storing it with the memory, it might be necessary to store every detail of the context, which could require a lot of storage space.

Any system that must perceive the environment and assess a situation can benefit from the system according to the principles of the present invention. Additionally, any system that acts in a real-world or information-world setting can incorporate the present invention to act in situations where decisions or actions should be different in different contexts. For instance, this could be of benefit to any autonomous vehicle, such as a robot or spacecraft. New environments can be imposed by disasters, which reorganize the landscape in drastic ways, and a system still needs to be able to perform perception and action. Specific examples of applications of the present invention are described below.

(4) SPECIFIC DETAILS OF THE INVENTION

(4.1) A Contextually Biased Memory System Simulating Human Performance

Figure 3:
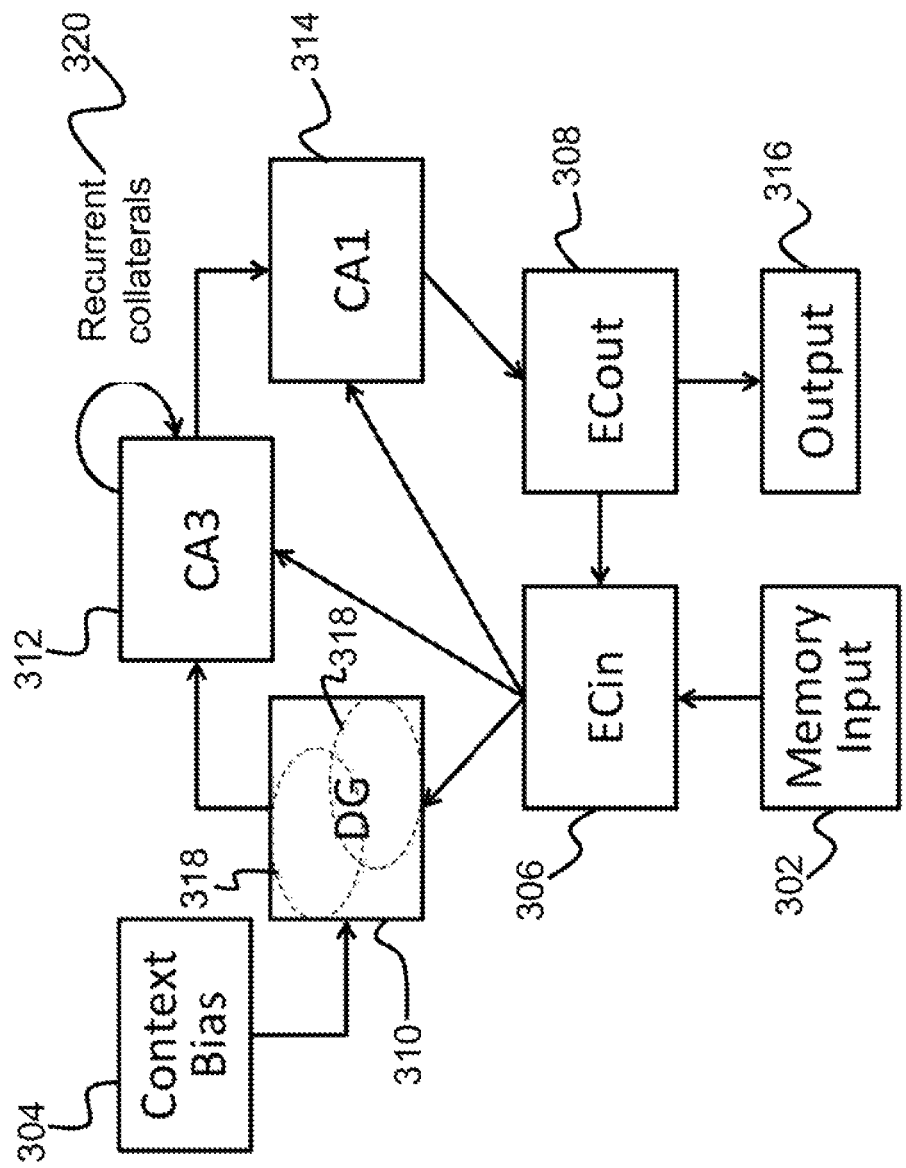
FIG. 3 is a block diagram depicting a memory system according to the principles of the present invention.

A block diagram of the components of the system according to the principles of the present invention is illustrated in FIG. 3, showing a memory system that encodes and stores memory inputs that come in through a memory input layer 302. Memory inputs are patterns of activation over the memory input layer 302 and a context bias layer 304. For example, memory inputs may be image arrays or arrays of numbers, provided that they represent some features of a context. As a non-limiting example, memory inputs can be arrays of floating point values in the range of (0, 1). Information is stored as activation values of each neural unit in each module/layer.

The memory system comprises a model of the hippocampus comprising an entorhinal cortex in (ECin) layer 306, an entorhinal cortex out (ECout) layer 308, a dentate gyrus (DG) layer 310, a Cornu Ammonis 3 (CA3) layer 312, a Cornu Ammonis 1 (CA1) layer 314, and the wiring connections between these layers. A generic model of the hippocampus is described in Literature Reference No. 5. See Literature Reference No. 5, which is hereby incorporated by reference as though fully set forth herein, for a detailed description of the processes that occur within and between layers of the hippocampus model depicted in FIG. 3.

The output 316 is taken directly from the ECout layer 308. The output 316 may be, for example, a copy of either an X or Y array, indicating which of the input objects in the context is most desirable, or should be selected. The output 316 can be displayed to a user in any standard manner, such as through a display screen. If the X and Y arrays are images, then the output 316 may be an "out" image indicating which array should be selected. If the X and Y arrays are arbitrary data, the output 316 could indicate which set of data is preferable. The memory system according to the principles of the present invention also comprises a unique subgrouping of DG neural units 318 represented by ovals, biased by the context bias layer 304.

Each layer is implemented by a rate-coded neural network. The smallest computational element is a "unit", which simulates a small population of neurons, modeled in a rate-coded fashion as integrate and fire point neurons. Each unit computes a weighted sum of the input conductances, both excitatory and inhibitory, passing this sum through a sigmoid function, and subjecting it to a minimum voltage threshold. The network is trained by running a learning algorithm on each projection between layers. This can be done by any suitable method known to those skilled in the art, a non-limiting example of which includes a contrastive Hebbian learning (CHL) (see Literature Reference No. 7 for a description of contrastive Hebbian learning). The network settles in an expectation phase followed by an outcome phase, and then computes a simple difference of a pre- and post-synaptic activation product across these two phases. Weights are changed by some portion of this simple difference, where the portion is a learning rate parameter that can be tuned as known to those skilled in the art, according to the needs of the application.

Automatic selection of relevant context features is done over multiple training sessions on a particular context. The first time, all non-salient features are included in the context component. The next time, the context gist (or component) is replaced by the intersection of the current non-salient features with the most recent context component used to identify this context. The context components are kept in a list; new contexts will be added to the end of the list. Then, when the system is exposed to a context, if it gets a match with one of the context components in the list, the index of that context component will be used to identify which DG subpopulation 318 should be allowed to be active to retrieve appropriate memories applicable to that context. Note that it is possible to get overlaps between content components. One can deal with that by allowing only the DG subpopulation 318 with the most context overlap to become active.

In an embodiment, the DG, CA3, and CA1 layers (elements 310, 312, and 314, respectively) each comprise 900, 240, and 384 neurons, respectively, and the ECin and ECout layers (elements 306 and 308) are both 92 neurons. Other embodiments may have fewer or more neurons for one or more layers. Inhibition may be modeled in each layer as a competitive k-winner-take-all process, where only the top k most active neurons stay active, and the activation level of the rest of the neurons in the layer is inhibited (see Literature Reference No. 5 for a description of modeling of inhibition). The equations disclosed in Literature Reference No. 5 directly compute a level of inhibitory conductance ($g\_i$) for all the neurons in a layer, with this value placed so as to keep k units above their firing threshold. The activity level allowed in each layer refers to the percentage of active neurons at any given time. The EC layers (i.e., ECin layer 306 and ECout layer 308) have fixed activity levels set at 18 of the 92 neurons, because that is close to the 25% activity level seen in human cortex. The memory input layer 302 can be configured to encode inputs as patterns of 18 out of 92 neurons. The DG, CA3 and CA1 layers (elements 310, 312, and 314) may have k set to allow an approximate selected percentage of the units to be active. The DG layer 310 may be set to have 1% activity, and the CA3 and CA1 layers (elements 312 and 314) may be set to have 2.5% activity.

Input patterns may be clamped onto the memory input layer 302 and context bias layer 304, and from there the Leabra algorithm propagates the activity through the network (see Literature Reference No. 8 for a description of the Leabra algorithm). The term "clamped" (e.g., input patterns being clamped) means the values in the memory input layer 302 and the context bias layer 304 (i.e., the activation values of each neuronal unit in it) are fixed; no process occurs in the layers. The configuration of each projection between layers, based on experimental studies of the present invention, is documented in the table in FIG. 4, which includes a projections column 400, a projection specifications (proj. spec.) column 402, a random (Rnd) column 404, a weight scale column 406, and a learning rate (lrate) column 408.

Projection specifications (402) are full or random. Projections describe connectivity between the neurons of one layer and the neurons of another layer, and a weighting for every connection in the projection. Full connectivity means each unit (or neuron) in the source layer projects to every unit in the target layer. Random means connections to the target layer are made with the given probability of connection. The Rnd column 404 documents the mean and variance of the random initial weight given to each source_unit→target_unit connection in a projection. A weight could most simply be described as the percent of a source unit's activity that is transmitted to a target unit over the projection. Each unit/neuron has a level of activation. This is derived from the idea of membrane voltage in biological neurons. In computational simulated neurons, it may be an average referred to as a "firing rate". In any case, depending on the simulation, activation may range between 0 and 1. Activity of a population of neurons can be visualized as an image, where each neuron is a dot whose color varies from white (0) to red (1).

Weight scales for each projection are listed in the table in FIG. 4 in terms of a relative normalized weight scale 406, relative to any other projection going to the same unit, and an absolute scale, which scales the activity without reference to any other projection to the layer. Finally, the lrate column 408 lists the learning rate for each projection. The learning rate controls how much the weights are allowed to change in each cycle of the learning algorithm. Leabra and CHL were presented as non-limiting examples of learning algorithms used; however, as can be appreciated by one skilled in the art, there are many learning algorithms that could be implemented. Basically, learning algorithms are described by differential equations that change the value of each weight depending on the activation values of each incoming connection, limited by the learning rate.

The context bias layer 304 is a special inhibitory projection, added into the voltage membrane equation of the DG layer 310 as an inhibitory current. The voltage membrane equation used to simulate neurons in the present invention is described in the appendix of Literature Reference No. 5, which is hereby incorporated by reference as though fully set forth herein. The concept is that the context pattern (i.e., an externally supplied context component input representing an environmental context) exerts a unique inhibitory pattern on DG layer 310 neurons, allowing only a unique subpopulation of neurons to become active. The inhibitory pattern of the context bias layer 304 is described above. In the voltage membrane equations (see Literature Reference No. 5 for the equations), the inhibitory pattern of the context bias layer 304 is incorporated as a level of inhibitory conductance, gi. For example, set gi=5 to quench all activity in a layer, and gi=1 to allow activity. A memory is stored in a DG[i]-CA3 complex, where [i] represents a DG module subarray (element 318). Salient information comes into the memory input layer 302 and is supplied to all DG modules (310 and 318), the CA3 module 312, and the CA1 module 314. When all but one of the DG subarrays (element(s) 318) is suppressed, the one that is left stays active and identifies which memories in that DG[i]-CA3 complex can be stored or recalled.

In one aspect, the context pattern is a tuple of floating point numbers, one for each of a set of DG layers (elements 600, 602, and 604 in FIG. 6, which are represented as element 318 in FIG. 3) that gives the amount of inhibition to be applied across that layer. This is the inhibitory conductance value $g\_i$ described above. A very high value of $g\_i$ (e.g., >4.0) effectively shuts down all activity in the neurons of the layer. A low value (e.g., <1.5) allows activity, based on the other inputs. Determination of what subpopulation of neurons is active is based on the particular value given by the context bias layer 304 to control the value of $g\_i$ in each subpopulation of neurons. These input values would be set by some external input, and they identify the context. There could be, in principle, thousands of different contexts, each represented by a different subpopulation of DG layer 310 neurons.

The tuple of floating point numbers of the context pattern could either be values of $g\_i$ for each DG subarray (an array of 5.0 with a single 1.0 in the $i^{th}$ index identifying the DG[i] array allowed to be active). Alternatively, depending on the implementation, one could most simply conceive of the tuple of numbers as an array of 0's with a single 1 in the $i^{th}$ index, identifying the active DG[i].

The pattern of activation in the DG layer 310 selects a unique attractor in the CA3 layer 312. An attractor is a set of numerical values toward which a system tends to evolve, for a wide variety of starting conditions of the system. In the present invention, attractor refers to the collective activation state of the neurons of the CA3 layer 312, which are trained through the process of the Leabra algorithm to be attracted to certain states, depending on the inputs. The system according to the principles of the present invention selects the most context-appropriate of the possible inputs, which represent choices. This is most important when the same choices are available in two or more contexts, but the appropriate choice differs depending on context. The context is chosen based on the subpopulation of neural units (or neurons) 318 in the DG layer 310 that is active, and based on that choice, the DG layer 310 will influence the CA3 layer 312 to settle on an attractor that represents the appropriate choice for that particular context.

As a non-limiting example, consider a robot with a tool belt. The robot has a memory system based on the system according to the principles of the present invention. The tools in the tool belt are the X and Y, which are a paint gun and an electric screwdriver. The context is the type of operation that is to be done. As a non-limiting example, we will say that the human teacher announces the context, and contexts are maintained on a list, and the index of the word in that list identifies the index of the DG subarray 318 that is allowed to become active (call it DGa 600), while all the other DG subarrays 318 are inhibited. The human teacher announces "painting" context, and while so biased, the human teacher teaches the robot by moving its hands in the right way, so the human teacher has the robot grasp the paint gun (X) and demonstrates the motions of painting the object. Since DGa 600 is the only DG subarray allowed to be active, all of these memories of the appropriate tool to use, the motions of painting, etc. are stored in a memory DGa-CA3 complex.

In a separate training example, the robot is taught a manufacturing operation. The human says the context is manufacturing, and the robot adds "manufacturing" to the list of contexts. This causes DGb 602 to be active and the rest inhibited. Note that the DG subpopulations 318 are probably best kept disjointed, so new contexts are added by accessing an unused DG subarray 318 or creating a new one, as needed. The X and Y inputs are still the paint gun and the electric screwdriver, but in this context, the human shows the robot how to grab the electric screwdriver. Parts are in racks and there is a table, and the human shows the robot how to grab parts and screw them together. These memories are then stored in a memory DGb-CA3 complex.

Later, the robot can be put into the appropriate context for either a manufacturing or painting task, and it will access the appropriate set of memories. As mentioned above, context can be a more general "gist" (or context component/pattern), which is a combination of all relevant non-salient aspects of the environment. For painting, the robot's odor senses (via, for example, an electronic nose) may pick up the scent of paint, toluene, and its vision senses may detect drop cloths and an object held in a fixture (to be painted). That odor and the drop cloths could potentially be turned into a gist of painting by some system external to the present invention. In any case, the context pattern would need to be turned into a tuple of values, one for each DG subarray, identifying which subarray is allowed to be active.

The CA3 layer 312, by virtue of its recurrent collateral projections 320, is the repository for the memory. The illustration in FIG. 3 depicts two dotted ovals, which represent two subpopulations of neural units 318 in the DG layer 310. This illustrates a situation where there are only two possible contexts, and only the neurons in the dotted lines of one of the ovals is allowed to be active, depending on which context is active. Since the DG layer 310 is large (due to the number of neural units), and has low activity (6%), there can be many such unique contexts.

Another way to implement the sub-populations in the DG layer 310 that represent different contexts is to actually divide the DG layer 310 into a number of separate, parallel sub-layers (represented by element 318 in FIG. 3 and elements 600, 602, and 604 in FIG. 6) of DG neurons, each representing a different context, and arrange for the context to inactivate all but one of the DG sub-layers. A new DG sub-layer may be added whenever a new context is received.

Figures 5A, 5B:
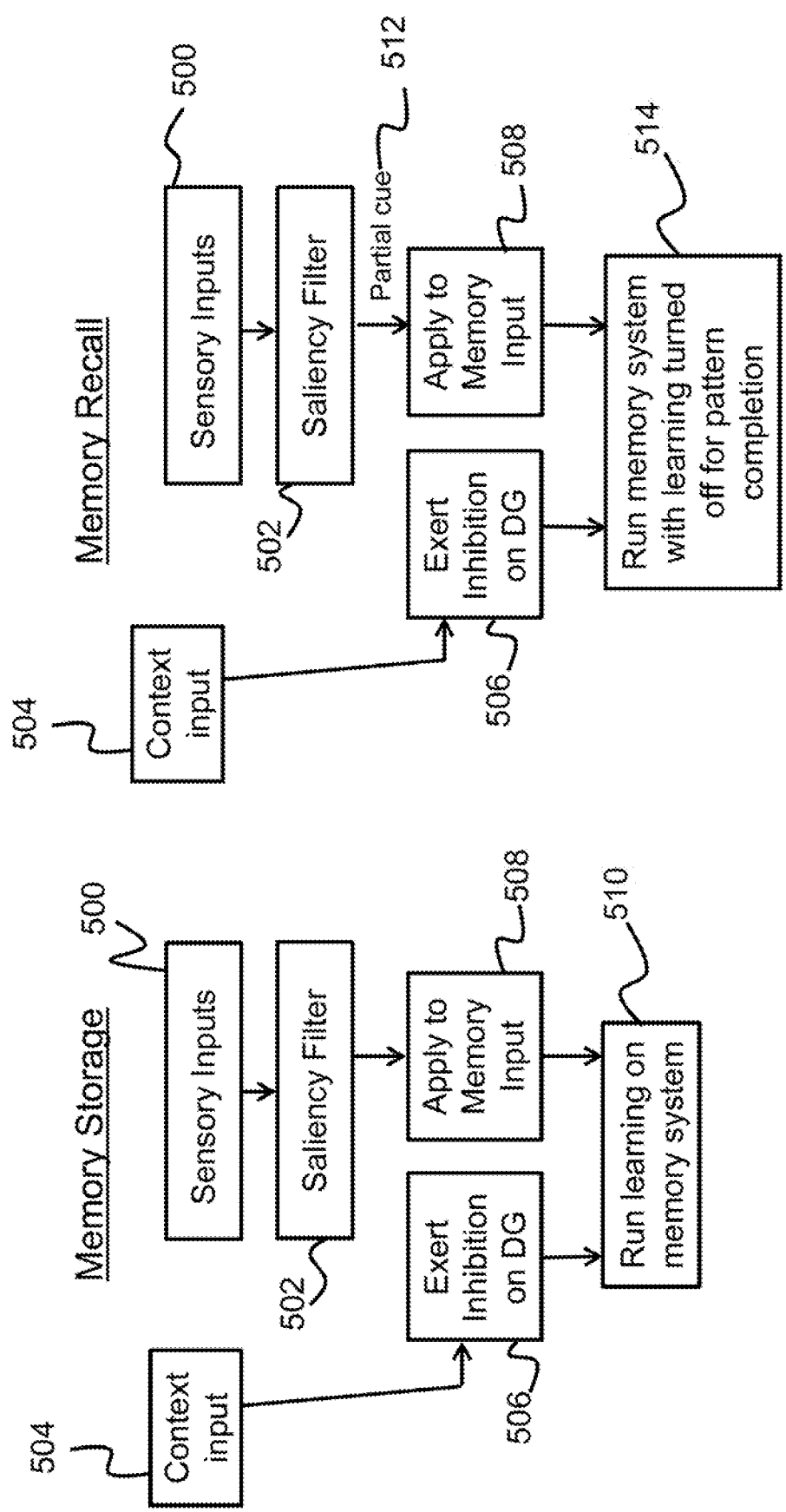
FIG. 5A is a flow diagram illustrating memory storage according to the principles of the present invention.
FIG. 5B is a flow diagram illustrating memory recall according to the principles of the present invention.

A flow diagram of the system according to the principles of the present invention is shown in FIGS. 5A and 5B, which depict memory storage and memory recall, respectively. The following description steps through the flow of the procedure. Storage of a memory is shown in FIG. 5A, where sensory inputs 500 (as measured by any suitable sensor, such as a camera, etc.) are processed by a saliency filter 502, which identifies objects in a scene that "stand out" and are task-relevant. Saliency is defined according to the task. For instance, if a robot moved in a room where the context is painting, the robot would find things salient that are related to painting, such as paint, a paint gun or brush, and an object somehow indicated to be painted (e.g., held in a way that allows it to be painted easily). Other objects (a window in the room) or the color of the walls, would be considered irrelevant.

A context component input 504 is supplied as an input by some external system (e.g., a human that declares a task context). The context component input 504 exerts the inhibitory bias on the DG layer 506, deactivating all but the units that represent the context. The salient objects are applied to the memory input 508. The learning algorithm is then run until the network has stored the memory sufficiently well (i.e., run learning on memory system 510). In the system according to the principles of the present invention, that requires at least 5 trials, where each trial consists of 65 minus phase cycles of settling followed by 20 plus phase cycles, and then the weights are adapted based on a factor of the difference between the minus and plus phase. The adaption of weights is as described above and in Literature Reference No. 5.

Recall of a memory, as depicted in FIG. 5B, is done by presenting a partial cue pattern 512 on the memory input layer 302 (i.e., apply to memory input 508). That means that some of the input is missing and a recall is required to complete it. As a non-limiting example, it is expected that ⅔ of the pattern be provided: the X input 606 and the Y input 608. The "Out" input 610 is left blank in the cue (input), but the memory fills it in in the output. As in the memory storage operation (FIG. 5A), the partial cue pattern 512 (an incomplete memory part) is applied to the memory input layer 302, and the context component input 504, which is non-salient, is applied to the context bias layer 304. Then the network is run without learning (i.e., run memory system with learning turned off for pattern completion 514), and the CA3 layer 312 will complete the partial cue pattern 512 by virtue of its recurrent collateral projections 320. Therefore, if the memory has been properly encoded, and a partial cue pattern 512 is given, the pattern is completed and the pattern at the output contains the complete memory as stored.

In experimental studies, the model's performance was matched to two recent reported studies of memory in rats. Peters (see Literature Reference No. 6) recently reported on an experiment in rats showing that the prefrontal cortex is critically involved in resolving interference between memories learned in different contexts. The experiment trained rats to remember lists of associations in different contexts, where the "memory inputs" labeled X and Y are the same in each room but the input labeled "rew" or "out" differ in different rooms. Therefore, the memories would conflict if it were not for the context bias exerted by the room itself.

Figure 6:
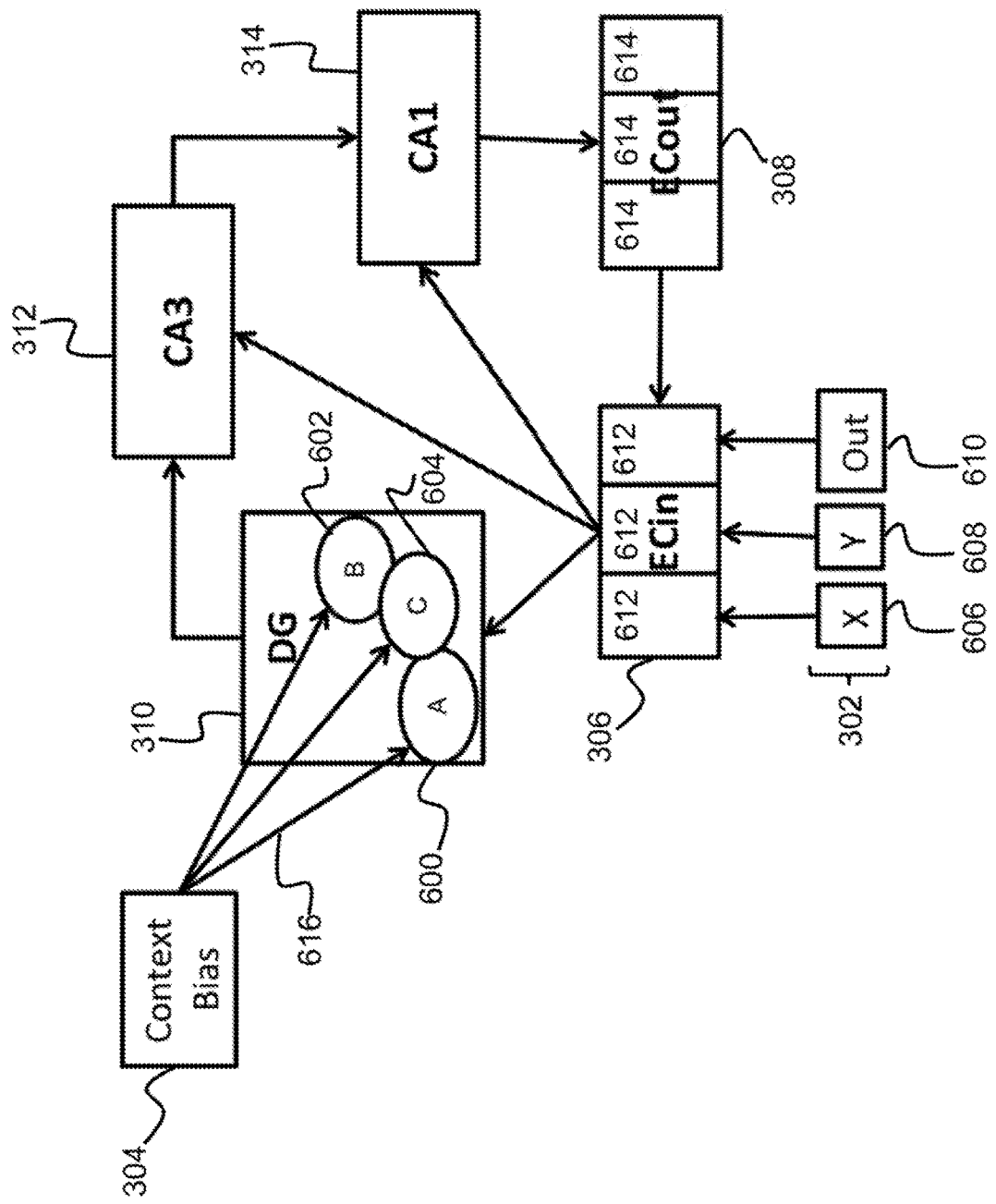
FIG. 6 illustrates network connectivity of the memory system according to the principles of the present invention.

FIG. 6 illustrates connectivity in the Peters network (see Literature Reference No. 6 for a description of the Peters network). In this case the DG layer 310 is split into 3 parallel sub-layers of neural units (element 318 in FIG. 3), a DGa layer 600, a DGb layer 602, and a DGc layer 604. Each of the parallel layers are non-overlapping, have the same size, and have the same learning rates and other properties. FIG. 6 shows a visualization of a network according to the principles of the present invention configured to implement and explain the reported rat performance described in Literature Reference No. 6. An X input 606, a Y input 608, and an "out" input 610, combined, are the equivalent of the memory input layer 302 depicted in FIG. 3, and the output 316 (not shown) is taken directly from ECout layer 308.

For this purpose, the 92 units of the ECin layer 306 and the ECout layer 308 were subdivided into three subgroups (ECin layer subgroups 612 and ECout layer subgroups 614) of 24 units each. Also, to simulate three different contexts, the 900 units of the DG layer 408 were divided into three layers of 300 units each (i.e., the DGa layer 600, the DGb layer 602, and the DGc layer 604). Since k=18 in the ECin and ECout layers (elements 306 and 308), six units were active in each of the inputs. Arrows 616 projecting from the context bias layer 304 represent an inhibitory bias that selects one of the DGa layer 600, the DGb layer 602, or the DGc layer 604 to be allowed to be active.

Figures 7A, 7B:
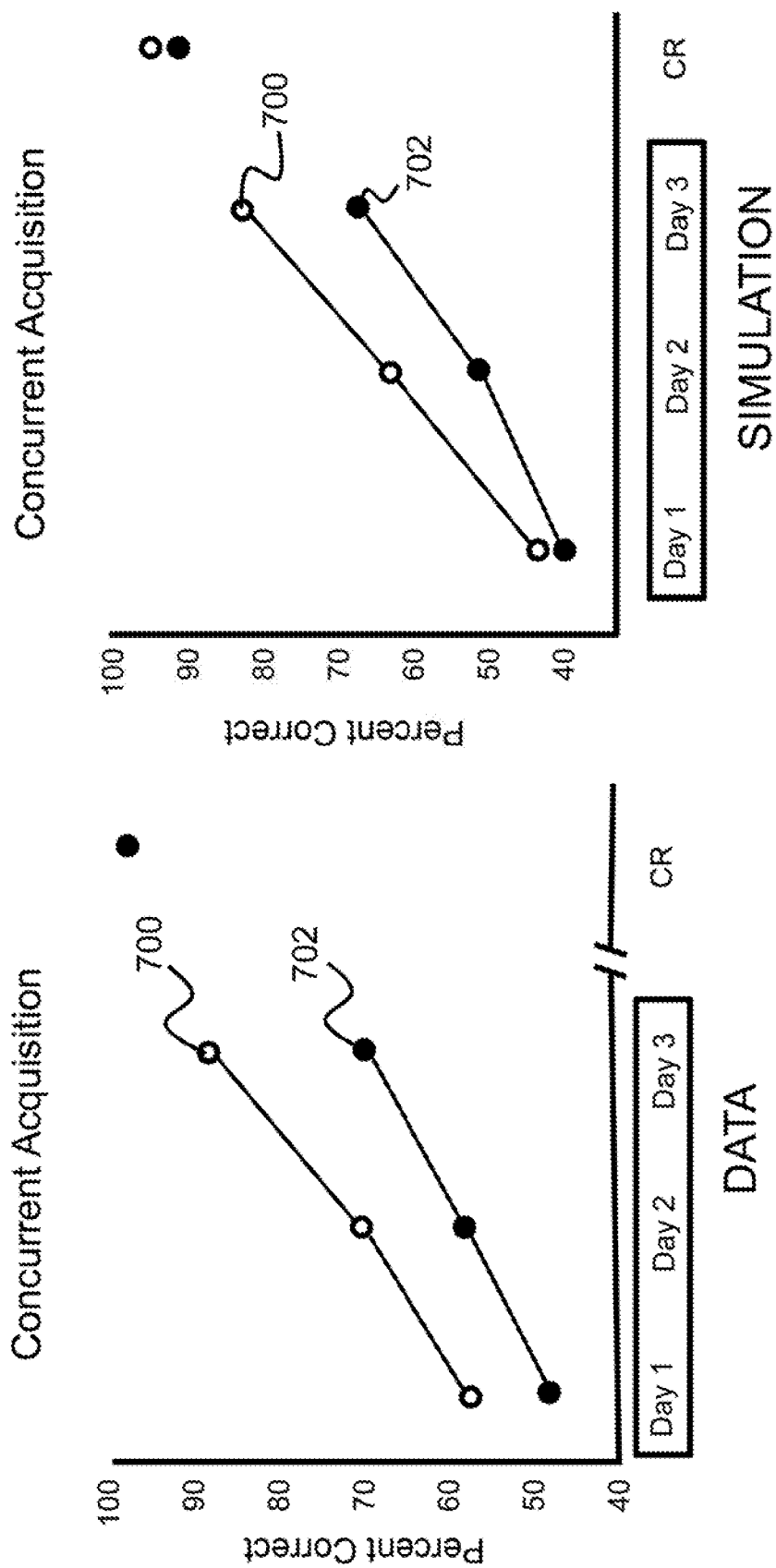
FIG. 7A illustrates a percentage of trials with a correct response during concurrent acquisition of odor discrimination in rats according to prior art.
FIG. 7B illustrates results of a simulation of the experiment depicted in FIG. 7A according to the principles of the present invention.
Figures 8A, 8B:
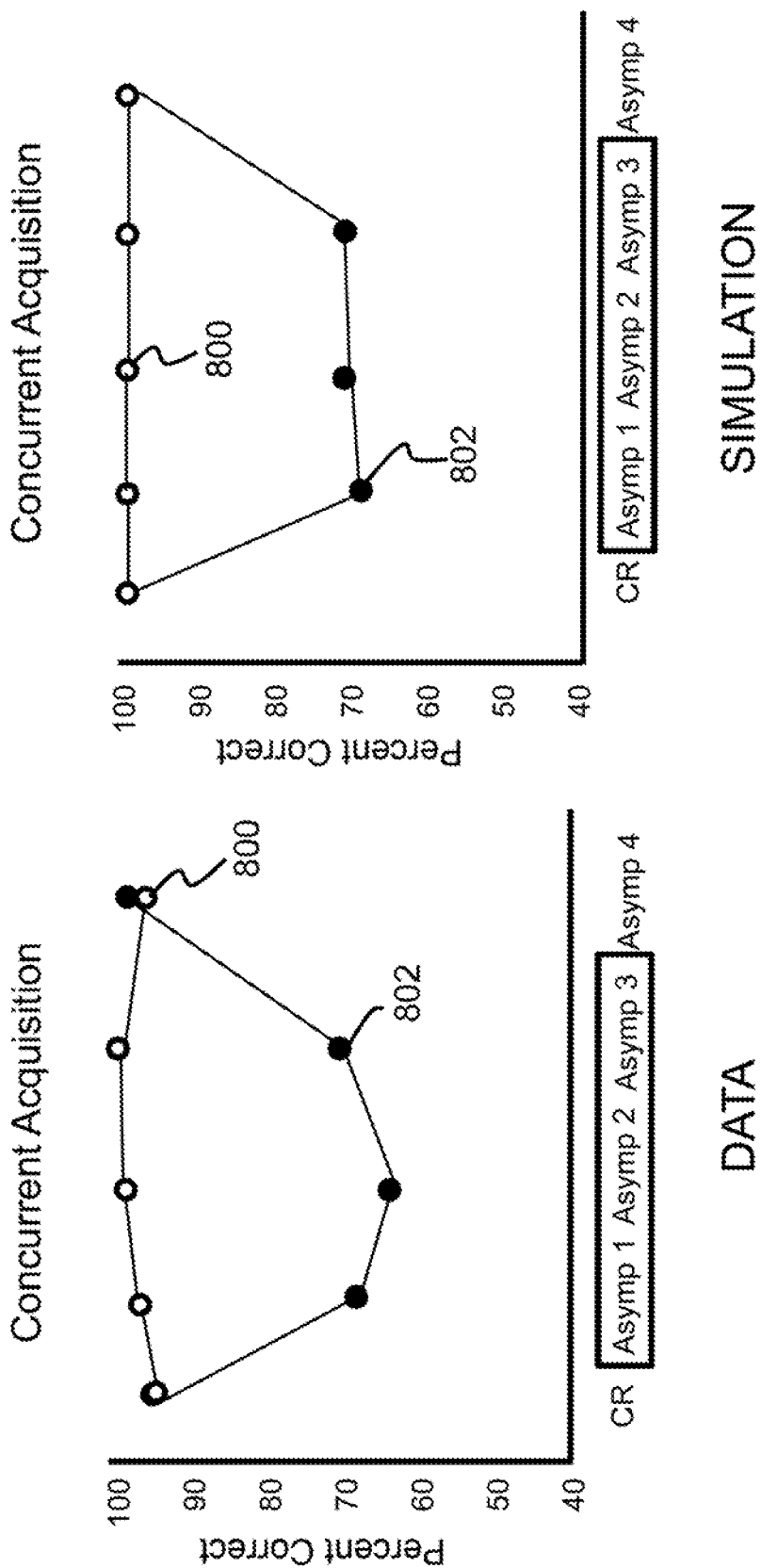
FIG. 8A illustrates the effects of muscimol on asymptotic performance of the concurrent discrimination task according to prior art.
FIG. 8B illustrates results of a simulation of the experiment depicted in FIG. 8A according to the principles of the present invention.

FIGS. 74A, 7B, 8A, and 8B illustrate a comparison between the results from the system according to the principles of the present invention (FIGS. 7B and 8B) and experiments with rats by Peters (see Literature Reference No. 5) (FIGS. 7A and 8A). FIGS. 7A and 8A illustrate inactivation of the mPFC (medial prefrontal cortex) during concurrent and blocked odor discrimination in experiments described in Literature Reference No. 6. In FIG. 7A, the percentage of trials with a correct response during the concurrent acquisition of eight odor discrimination problems is shown for saline rats (represented by open circles 700) and muscimol rats (represented by closed circles 702). Infusions of either saline or muscimol were given to rats prior to each of the first three training sessions (indicated by the box around days 1-3). By the times the rats reached the behavioral criterion (CR session) the muscimol rats (702) had caught up to the performance level of the controls (i.e., saline rats (700)).

FIG. 8A illustrates the effects of muscimol on asymptotic performance of the concurrent discrimination task in Literature Reference No. 6, with saline rats represented by open circles 800 and muscimol rats represented by closed circles 802. Infusions of saline or muscimol were given prior to the first 3 days of post-criterial asymptotic performance (Asymp 1-3). Data of the criterial session (CR) and fourth session, which did not involve infusions, are also shown for comparison. As shown, the simulation results in the plots of FIGS. 7B and 8B are a very close match to the results in the plots of FIGS. 7A and 8A (prior art), respectively.

(4.2) Top-Down Modulation of Episodic Memories

Prefrontal cortex (PFC) is responsible for top-down executive control and, with its widespread connectivity, can filter out arbitrary task-irrelevant neural representations in distributed cortical areas (see Literature Reference No. 48). An important aspect of this filtering is selecting the most relevant previous experiences to guide current behavior. Several studies have demonstrated coordinated interactions between PFC and hippocampus, including the studies described in Literature Reference Nos. 21 and 36. However, the mechanisms by which PFC influences memory are not clear, possibly because there are no direct projections from PFC to the hippocampus.

PFC can di-synaptically modulate hippocampal cell excitability via hypothalamus and thalamus (see Literature Reference No. 74). In particular, DG and CA3 cells in the hippocampus can be modulated by means of hypothalamic supramammillary nucleus (see Literature Reference Nos. 20, 24, 65, and 70), and CA1 cells through thalamic nucleus reuniens (see Literature Reference Nos. 69 and 71). It is also well known that different subsets of hippocampal neurons are assigned to encode memories experienced in different contexts (see Literature Reference Nos. 37, 41, and 42). Specifically, DG neurons encoding various memories in one context are not only sparse and distributed but also statistically independent from those encoding memories in a different context (see Literature Reference Nos. 15, 43, 44, and 62). The system described herein makes a direct link between these two sets of data in a unique hypothesis that PFC exerts inhibitory control over DG by modulating cell excitability to recruit an independent sparse set of cells for encoding and recalling various memories experienced in a given context.

Such an understanding of brain-wide memory processes at the neural level is critical for targeted neurostimulation-based therapies for memory enhancement and restoration. The present invention provides a basis for planning neuromodulation enhancement therapies. It can be used to simulate how mPFC activity, with or without neuromodulation, affects the encoding and recall of contextually based memories. Specifically, the model described herein can be used to estimate the enhancement of contextual signals for hippocampal encoding and recall by modulating the activity of the mPFC in the model according to embodiments of the present disclosure.

(4.2.1) Experimental Studies

Figure 9:
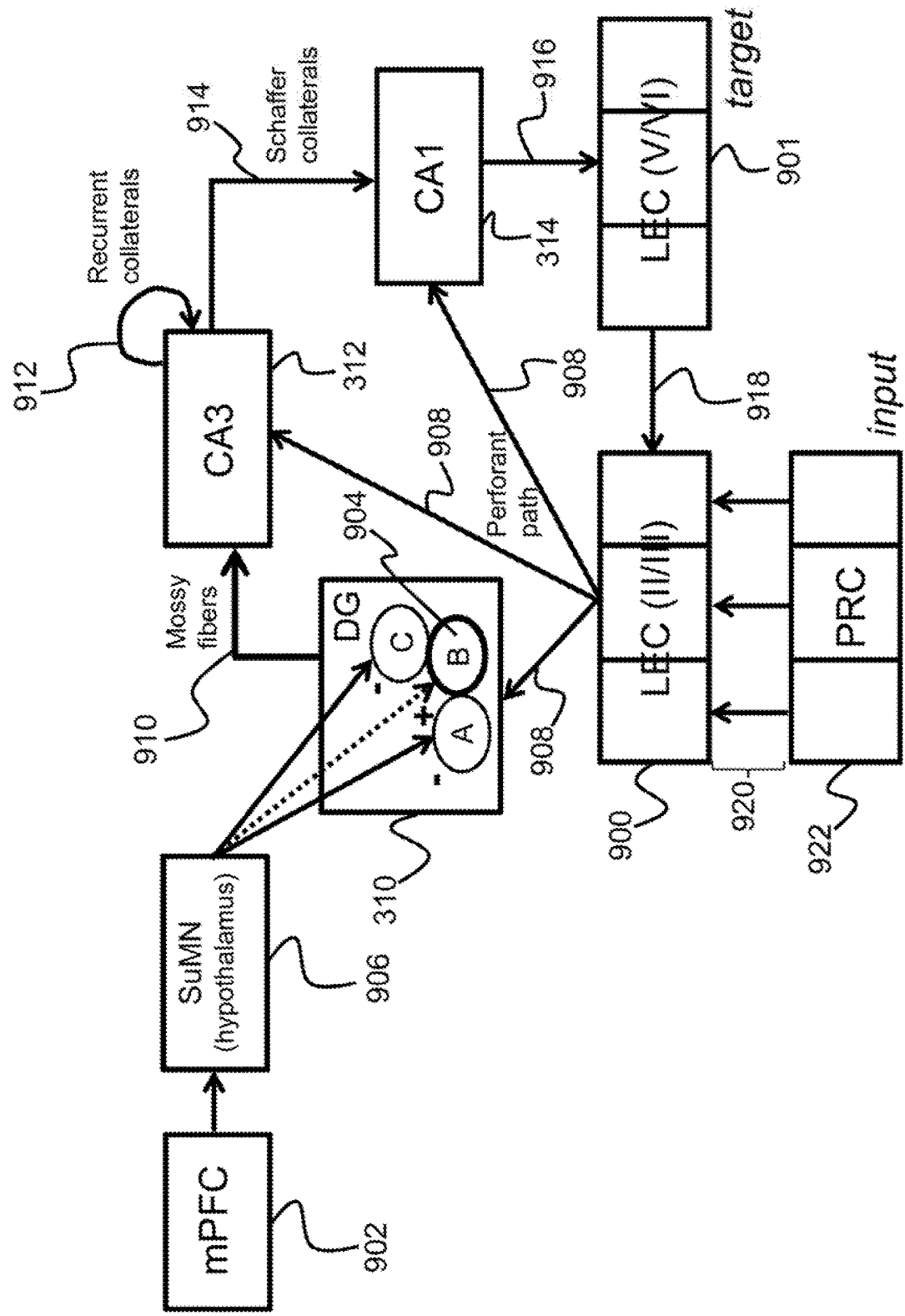
FIG. 9 illustrates a block diagram illustrating the connectivity of the model for prefrontal modulation of context-specific memory according to embodiments of the present disclosure.

FIG. 9 illustrates a model according to embodiments of the present disclosure depicting how episodic memories can be encoded and retrieved in a context-sensitive manner. It employs rate-coded point neurons in multiple layers and subfields within the entorhinal-hippocampal system; namely, superficial and deep layers of lateral entorhinal cortex (LEC) 900 and 901, dentate gyrus (DG) 310, and areas CA3 312 and CA1 314 within the hippocampus. The model according to embodiments of this disclosure builds on a recent hippocampal model proposed by Ketz et al. (see Literature Reference No. 35 for a description of the Ketz model). The Ketz model is capable of forming arbitrary associations among input streams, and also performing pattern completion. It achieves these functions by operating in different modes, similar to some prior theoretical proposals, such as those described in Literature Reference Nos. 25 and 39).

The encoding mode of the present invention, also found in the Ketz model, comprises two phases, called first minus phase and plus phase, during which the projections from CA3 312 to CA1 314, which are part of the tri-synaptic (indirect) pathway, are weakened. The retrieval mode, or the second minus phase, weakens the projections from the superficial layers of EC (namely, ECin 306) to CA1 314, which form the mono-synaptic (direct) pathway. The activities in the input cortical area upstream to ECin 306 are clamped during all three phases, while those in the deep layers of EC (namely, ECout 308) are additionally clamped to the incoming patterns during the plus phase. In other words, the memory system experiences the target cortical patterns in ECout 308 during the plus phase in the encoding trials. Memory retrieval is assessed in ECout 308 at the end of the second minus phase, which registers the system expectation following pattern completion. Each cycle of these phases (first minus phase→second minus phase→plus phase) corresponds to one trial of memory formation and/or recall.

Medial prefrontal cortex (mPFC) 902 modulates context-specific encoding and retrieval in the entorhinal-hippocampal system by dynamically facilitating only a subset of DG 310 granule cells to represent various memories within a particular context (e.g., B represented by element 904 in FIG. 9) via hypothalamic supramammillary nucleus (SuMN) 906. Only three (3) contextual ensembles of DG cells are depicted (A, B (element 904), and C), but note there would be innumerable such groups within a real DG that are each recruited for a specific context. The superficial (LEC II/III 900) and deep (LEC V/VI 901) layers in only the lateral region of the entorhinal cortex (LEC) are included in FIG. 9, because the constituents of episodic memories, relevant to the mPFC 902 inactivation experiments that the model simulates, are non-spatial odor cues.

The connectivity within the entorhinal-hippocampal system follows well-known anatomical details: perforant path projections 908 from superficial layers of LEC 900 to DG 310, CA3 312, and CA1 314; Mossy fibers 910 from DG 310 to CA3 312; recurrent collaterals 912 within CA3; Schaffer collaterals 914 from CA3 312 to CA1 314; backprojections 916 from CA1 314 to deep layers of LEC (LEC V/VI 901); and intracortical feedforward projections 918 within LEC from deep (LEC V/VI 901) to superficial LEC II/III 900)

layers. High-level cortical signals 920 conveying requisite codes for the two odor cues in each discrimination problem arrive at LEC via perirhinal cortex (PRC) 922 as the input. Memory retrieval of which odor for a given pair of cues is associated with reward is assessed by comparing the activity at the end of second minus phase in the deep layers of LEC (LEC V/VI 901) with respect to target patterns.

During memory acquisition, the synaptic weights in the network change in an activity-dependent manner at the end of the plus phase using a combination of Hebbian and error-driven learning. For Hebbian learning, the weight changes depend on just the plus phase activities. For error-driving learning, the weight changes for connections in the tri-synaptic pathway (ECin→DG and CA3, DG→CA3, CA3→CA1) depend on activities in the plus phase and second minus phase, whereas the weight changes for connections in the mono-synaptic pathway (ECin→CA1, CA1→ECout, ECout→ECin) depend on activities in the plus phase and first minus phase.

Several changes have been made to the Ketz model. A key innovation is to distinguish different subsets of DG 310 cells (A, B (element 904), and C) that are enabled in different situational contexts. This is critical as it relates to the hypothesis that the contextual recruitment of DG 310 cells is governed by top-down inhibitory control from mPFC 902. Additional technical changes, which are relevant from a scientific point of view, include the following. First, synaptic plasticity in a majority of the connectivity (perforant path 908: ECin→DG and CA3; Mossy fibers 310: DG→CA3; Schaffer collaterals 914: CA3→CA1) is fully Hebbian (i.e., $k_{hebb}=1.0$ in Equation (6)), and not a combination of Hebbian and error-driven learning that is heavily biased towards the latter. Second, there are no EC-like slots in CA1, as CA1 has conjunctive/episodic cells like CA3, which can develop and sustain even without CA3 input in response to divergent perforant path projections 908 from EC layers II/III. Third, ECout→CA1 backprojections were removed, as there is little supporting evidence.

The following is a description of how a context-specific odor discrimination memory is formed and recalled in the model according to embodiments of the present disclosure. Suppose a rat enters context A for the first time and encounters two dishes $X_1$ and $Y_1$ with distinct odors. The experimenter has placed a reward only in one dish, for example $X_1$, and the rat is allowed to dig for the reward only from one dish in each trial. If, by chance, the rat chooses the correct dish and, thereby, obtains the reward, then an episodic memory is formed for context A that is composed of the association between the two odor cues of $X_1$ and $Y_1$ and the presence of reward in $X_1$. If, by chance, the rat chooses the incorrect dish and thereby obtains nothing, then a different memory can be formed for context A that is composed of the association between the two odor cues of $X_1$ and $Y_1$ and the frustrating lack of reward in $Y_1$. Without loss of any generality, it is assumed that only rewarded events are encoded by the hippocampus. As the memory of the rewarded event gets strengthened with experience from several trials in context A, the rat gradually makes fewer errors in making the memory-guided choice whenever it encounters odor cues $X_1$ and $Y_1$ in context A. The rat can learn several other discrimination memories within the same context (e.g., $\{X_2,Y_2\}\rightarrow X_2$, $\{X_3,Y_3\}\rightarrow Y_3$).

In Experiment 1A of Peters et al. (see Literature Reference No. 61), the rats were presented with a sequence of eight (8) discrimination problems in random order on each day until they reached a criterion level of performance in terms of the number of correct choices across the 8 pairs. The rats could also learn and remember a new set of odor discrimination problems in another context B. The context B-specific memories can exhibit different levels of overlap in the components of episodes from context A. In the experiment of Navawongse and Eichenbaum (described in Literature Reference No. 56), the rats were presented with the same pair of odor cues in context B (namely, $\{X_1,Y_1\}$) but the baited dish was the opposite of that in context A (i.e., $\{X_1,Y_1\}\rightarrow Y_1$).

In Experiments 2 and 3 of Peters et al. (Literature Reference No. 61), the rats were required to learn a new set of odor discrimination problems either within the same context or a different context. Here, the memories overlapped only in one component. In particular, one odor in each pair was retained and the reward prediction of this odor was reversed compared to the first set. For example, for the episode $\{X_1,Y_1\}\rightarrow X_1$, if $X_1$ were retained then the new rewarded event would be $\{X_1,Z_1\}\rightarrow Z_1$; whereas if $Y_1$ were retained then the new rewarded event would be $\{Z_1,Y_1\}\rightarrow Y_1$.

Figure 10:
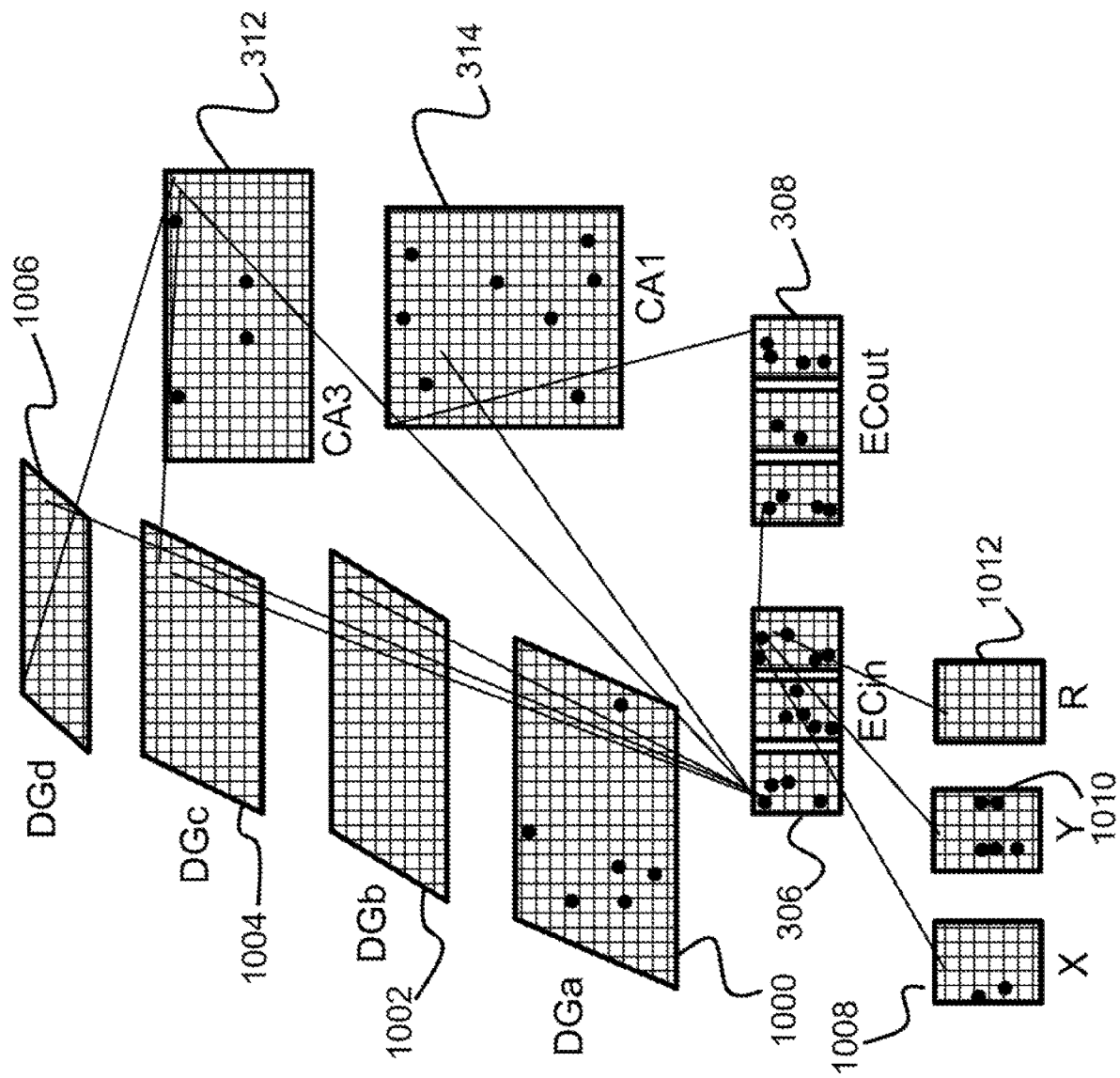
FIG. 10 illustrates a screenshot of the model's activity according to embodiments of the present disclosure using a neural network simulator.

The three components of each odor discrimination memory (e.g., $\{X_1,Y_1\}\rightarrow X_1$) are represented by sparse distributed codes in distinct cortical populations upstream of the entorhinal-hippocampal system (i.e., groups of neurons labeled X, Y, and R in FIG. 10.

In simulations using the present invention, each unique odor is assigned a randomly constructed binary bit pattern on a 6×4 grid with exactly six (6) cells turned on (maximal activation of 1). As depicted in FIG. 10, the model described herein incorporates four (4) independent contextual subsets of cells in DG (namely, DGa 1000, DGb 1002, DGc 1004, and DGd 1006), whose recruitment is controlled by direct modulation of cell excitability. In particular, the excitability of context-inappropriate DG cells is temporarily suppressed by raising their maximal inhibitory conductance parameter (namely, $\bar{g}_i$ in Equation (2)). When mPFC 902 is inactivated, there is a loss of this inhibitory control over the DG 310. In other words, the excitability of all DG cells remains at normal levels without any top-down relative bias for a particular contextual set.

FIG. 10 depicts a screenshot of the activity of the model according to embodiments of the present disclosure. The screenshot was produced using a emergent neural network simulator (see Literature Reference No. 9 for a description of the neural network simulator) in various cortico-hippocampal stages during recall of the rewarded choice when in context A at the end of the second minus phase. Only the subset of DG cells that represent context A (in the pool named DGa 1000) are facilitated to become active. Cell excitability is drastically reduced for DGb 1002, DGc 1004, and DGd 1006 pools representing the other three contexts.

The odor stimuli that define the discrimination problem are represented by high-level cortical codes in the segmented pools named X 1008 and Y 1010, upstream of the superficial layers of EC (ECin 306). The pool named R 1012 identifies which of the two odors is associated with reward in this problem. The memory system must complete the missing pattern for R 1012 in the corresponding slot within the deep layers of EC (ECout 308) based on intrahippocampal interactions, including those in CA3 312 recurrent network. The missing pattern is also filled in the corresponding slot within ECin 306 due to the one-to-one connections from ECout 308. Note the pattern recalled for R 1012 is the same as the one for X 1008, which means that X 1008 is the one that lead to the reward earlier.

Context A is used to simulate the data for Experiment 1 described in Literature Reference No. 61, while contexts A and B are both employed for the other experiments. A simple scheme was devised to emulate the innumerable contexts the rats may have experienced in their lifetimes, for which they have formed memories that could potentially interfere with encoding stimuli in these contexts. For this purpose, two odor discrimination lists with high interference (overlap of one odor in each problem presented in the contexts at hand) were designed. Model rats acquired these lists for five (5) blocks each in the other two contexts C and D before the experimental manipulations. Below is a description of how each of the experiments was simulated.

To simulate the experiments described by Navawongse and Eichenbaum in Literature Reference No. 56, model rats (n=10) were trained to learn the memory of $\{X_1,Y_1\} \rightarrow X_1$ (i.e., perform cue-based retrieval to criterion) in context A, and then to learn the memory of $\{X_1,Y_1\} \rightarrow Y_1$ to criterion in context B. In trials that assessed memory behavior following acquisition, with either saline or muscimol injections into mPFC, re-encoding of memories was not assumed. As a reminder, the muscimol condition was simulated by allowing all DG cells to become active, whereas the saline (control) condition was simulated by increasing $\bar{g}_i$ on subpopulations of DG neurons that do not code for the current context.

For all experiments, the retrieval performance P (%) in response to a given cue was assessed using a similarity metric that compares the recalled pattern $R_{out}$ at the end of the retrieval phase in the third field (e.g., $\{X_1,Y_1\} \rightarrow ?$) of the deep layers of EC (ECout), which represents the cortical read-out of the hippocampal recall process, with the correct pattern $R_{targ}$ to be retrieved (e.g., $X_1$ in context A, and $Y_1$ in context B) as follows:

$$P = 100 \times \left[1 - \frac{\left(\text{MIN}\left\{\frac{1}{\sqrt{N}}\|R_{out} - R_{targ}\|_2, 0.5\right\}\right)^{10}}{0.5^{10} + \left(\text{MIN}\left\{\frac{1}{\sqrt{N}}\|R_{out} - R_{targ}\|_2, 0.5\right\}\right)^{10}}\right] \quad (1)$$

where $\|\ldots\|_2$ is the $L^2$ norm and N is the size of the patterns. Note that elements of either pattern have values ranging from 0 to 1 representing each cell's degree of activity.

To simulate Experiment 1A of Peters et al. (Literature Reference No. 61), model rats (n=10 for intact mPFC [control]; n=10 for inactivated mPFC [muscimol]) were trained to learn a list of odor discrimination memories ($\{X_i,Y_i\} \rightarrow X_i/Y_i$, i=1 . . . 8) in context A across several blocks until criterion performance was achieved (i.e., 90% accuracy in two consecutive blocks). Each discrimination problem was presented once per block in random order. Muscimol rats had their mPFC inactivated only during the first three (3) blocks. For each rat, once criterion was reached, four memory performance assessment blocks were conducted. These test blocks did not involve new encoding as neither odor cues nor the context were novel any more. As in the experiment, the first three of these test blocks were assessed under mPFC inactivation for the control rats only. To simulate Peters et al experiments, rats were pre-exposed in contexts C and D to interfering lists of discrimination episodes (C: $\{X_i,Z_i\} \rightarrow X_i/Z_i$, i=1 . . . 8; D: $\{Z_j,Y_j\} \rightarrow Z_j/Y_j$, j=1 . . . 8) until they were learned to criterion.

To simulate Experiment 1B of Peters et al. (Literature Reference No. 61), a new cohort of model rats (n=10 for intact mPFC [control]; n=10 for inactivated mPFC [muscimol]) was trained to learn one odor discrimination problem at a time to criterion, unlike the concurrent acquisition in Experiment 1A described above. The relative order for acquiring the memories was chosen randomly. For muscimol rats, all trials occurred under mPFC inactivation.

To simulate Experiment 2 of Peters et al. (Literature Reference No. 61), a new set of model rats (n=40) were first trained in context A to learn to criterion the same list of discrimination problems that was used for Experiment 1A. They were then trained on a new list of memories for five (5) blocks. As mentioned above, these two lists conflicted as follows: for each context A memory (e.g., $\{X_1,Y_1\} \rightarrow Y_1$), one of the two odor cues was randomly replaced by a new cue (e.g., $W_1$ instead of $Y_1$), and the reward prediction of the remaining cue from context A (i.e., $X_1$) was reversed leading to $\{X_1,W_1\} \rightarrow X_1$. Rats were exposed to List 2 either in the same context A (n=20) or a different context B (n=20), with either an intact (n=20) or an inactivated (n=20) mPFC. In other words, this experiment employed a 2×2 design with the following subsets of rats: control—different context, control—same context, muscimol—different context, and muscimol—same context. As in Experiment 1A, muscimol rats had their mPFC inactivated only for the first three (3) blocks to learn List 2.

To simulate Experiment 3 of Peters et al. (Literature Reference No. 61), a new cohort of model rats (n=10 for intact mPFC [control]; n=10 for Inactivated mPFC [muscimol]) was first trained in context A for five (5) blocks with the same list of discrimination problems used in Experiment 1A, and then trained on the second, conflicting list from Experiment 2 for five (5) blocks in the same context A. mPFC inactivation for the muscimol group occurred only during the first three (3) blocks for List 1.

The model according to embodiments of this disclosure simulates memory formation and recall using dynamic sparse ensemble codes and activity-dependent synaptic plasticity in the recurrent connections within the hippocampus. Simulations were performed in the emergent neural network simulator (see Literature Reference Nos. 9 and 58 for a description of the emergent neural network simulator), whose underlying equations are described in detail below. Values for various model parameters are listed in the tables of FIGS. 17-19.

The potential $V_m$ of a given model cell is defined by a membrane equation that obeys shunting dynamics within a recurrent competitive network according to the following:

$$\frac{dV_m(t)}{dt} = \tau\{\bar{g}_l(E_l - V_m(t)) + g_e(t)\bar{g}_e(E_e - V_m(t)) + g_i(t)\bar{g}_i(E_i - V_m(t))\}, \quad (2)$$

where $\tau$ scales the rate of the cell's temporal integration; $\bar{g}_l$ is the constant conductance of the leak Cl$^-$ channel; $E_l$ is the reversal potential of the leak Cl$^-$ channel; $\bar{g}_e$ is the maximal conductance of each excitatory channel; $E_e$ is the corresponding reversal potential; $\bar{g}_i$ is the maximal conductance of each inhibitory channel; $E_i$ is the corresponding reversal potential; $g_e$ is the net synaptic weight of excitatory channels controlled by cells either within the network or from other networks; and $g_i$ is the net synaptic weight of inhibitory channels controlled by cells within the network. The net excitatory synaptic weight $g_e$ is defined as follows:

$$g_e(t) = \sum_j \sum_h \left(\frac{r_j}{\sum_k r_k}\right) a_j w_h^j, \quad (3)$$

where $w_h^j$ is the synaptic weight of the excitatory projection from the hth cell in the jth network; $r_j$ is the relative weight for the jth network that is normalized by net relative weight for all incoming networks; and $a_j$ is the absolute scaling parameter for the projections from the jth network. The output activity $y(t)$ of the cell is computed using an activation function that operates on the membrane potential as follows:

$$y(t) = \frac{X}{1+X} \text{ with } X = \Upsilon[V_m(t) - \Theta]_+, \quad (4)$$

where $$\frac{X}{1+X}$$

is the Michaelis-Mentin kinetics function; $\gamma$ is a scaling parameter; $\Theta$ is the activity threshold on the membrane potential; and $[\ ]_+$ denotes the half-wave rectifier function. The net inhibitory synaptic weight $g_i$ is a constant for all cells within the network such that only a given proportion of the cells (e.g., the top k) exhibit non-zero activities at any moment, and is defined as follows:

$$g_\Theta^k = \frac{g_e \bar{g}_e (E_e - \Theta) + \bar{g}_l (E_l - \Theta)}{\Theta - E_i} \text{ and} \quad (5)$$

$$g_i(t) = g_\Theta^{k+1} + q(g_\Theta^k - g_\Theta^{k+1}) \text{ with } 0 < q < 1,$$

where $g_\Theta^k$ is the threshold inhibition for the cell with the kth most membrane potential in the network. These equations to determine $g_i$, thus, implement k-Winner Take All (WTA) inhibition, leading to sparse distributed representations (see Literature Reference No. 58 for a description of the preceding equations and their relationship to kWTA). While not biologically plausible, the equations provide a simple computational approximation to the function of feedback inhibitory interneurons in real neural networks.

All membrane potentials are initialized to $V_{rest}$ at the start of each trial. However, model CA1 314 cells are reset to $V_{rest}$ at the start of each of the three phases (namely, first minus phase, second minus phase, plus phase) in every trial. Additionally, cell activities in the deep layers of LEC (namely, ECout 308) are clamped during the plus phase (in the encoding trials) to the incoming pattern in the high-level cortical area upstream to LEC. In every encoding trial, the three phases proceed in sequence as follows, each with a fixed number of time steps: first minus phase (32 steps) →second minus phase (33 steps)→plus phase (20 steps). The differential equations governing membrane potential dynamics were numerically integrated using Euler's forward method with a fixed time step $\Delta t$=1 ms (milliseconds).

The adaptive weights, $w_h^j$, of the excitatory synaptic connection from the hth cell in the jth network are updated at the end of plus phase in each encoding trial using a combination of Hebbian learning and error-driven learning (see Literature Reference No. 58) according to the following:

$$\Delta w_h^j = \epsilon[k_{hebb}(\Delta w_{hebb}) + (1 - k_{hebb})(\Delta w_{err})] \text{ with } 0 < k_{hebb} < 1, \quad (6)$$

where $\epsilon$ scales the rate of learning, and $k_{hebb}$ is a parameter that determines the proportion of Hebbian learning compared to error-driven learning in the mixture. The Hebbian ($\Delta w_{hebb}$) and error-driven ($\Delta W_{err}$) weight updates are defined as follows:

$$\Delta W_{hebb} = y^+(x_{h,j}{}^+ - w_h^j) \quad (7)$$

$$\Delta w_{err} = (x_{h,j}{}^+ y^+) - (x_{\bar{h},j} y^-), \quad (8)$$

where $x_{h,j}$ is the activity of the projecting cell, and the superscripts $^+$ and $^-$ correspond to activities at the end of the plus phase and the applicable minus phase, respectively. Equation (7) is a variant of Hebbian learning that prevents the weights from growing without bounds (see Literature Reference No. 58). It ensures the selective strengthening of projections from those input cells that are consistently co-active with the post-synaptic cell during the plus phase. Equation (8), which is equivalent to the contrastive Hebbian learning rule (see Literature Reference No. 27 for a description of the contrastive Hebbian learning rule), ensures the gradual matching between activities at the end of minus (expectation) and plus (output) phases. The error-driven weight updates and the weights themselves are subject to exponential soft bounding between the limits of 0 and 1. The weights of all present projections for each model rat are initialized at the beginning of experience by random sampling from a uniform distribution with mean 0.5 and variance 0.25. See the table in FIG. 18 for probabilities related to sparse connectivity in the perforant path and Mossy fiber projections.

(4.2.2) Experimental Results

Described are results of the model according to embodiments of the present disclosure that simulate and explain data from each of the odor discrimination experiments described above that reveal top-down modulation of memory encoding and retrieval in the hippocampus and highlight the distributed nature of memory processes. With independent pools of DG cells that are facilitated for various contexts under normal mPFC operation, the model described herein can successfully retrieve context-appropriate memories and correctly discriminate in response to various pairs of odor cues. Even if a same stimulus is experienced across contexts (e.g., odor $X_1$), different associations can be learned in different contexts (e.g., $X_1 \leftarrow Y_1$ in context A; $X_1 \leftarrow Z_1$ in context B). Moreover, this occurs despite the direct perforant path projections from the input, superficial layers of EC (ECin 306) to CA3 312 and CA1 314. This is possible in the model according to embodiments of the present disclosure, because not only are different contexts distinguished within the DG 310, but also the Mossy fiber projections from DG 310 to CA3 312 are stronger relative to other connections to CA3 312 cells (i.e., EC→CA3; CA3→CA3) (see the table in FIG. 18).

Figure 11A:
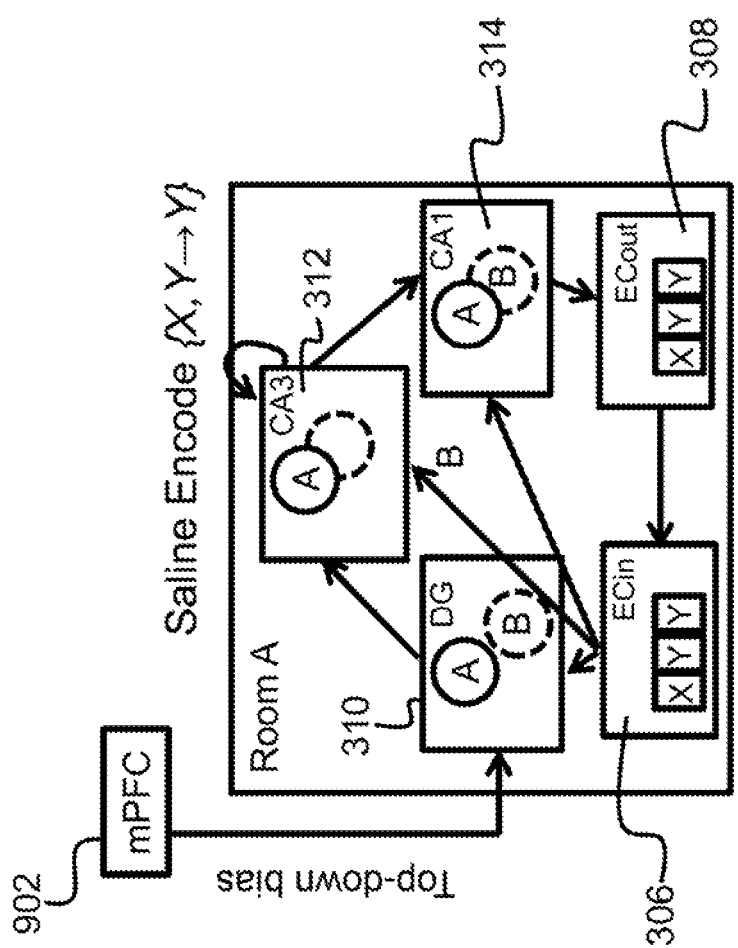
FIG. 11A illustrates a prior experience where an associative memory is encoded according to embodiments of the present disclosure.
Figure 11C:
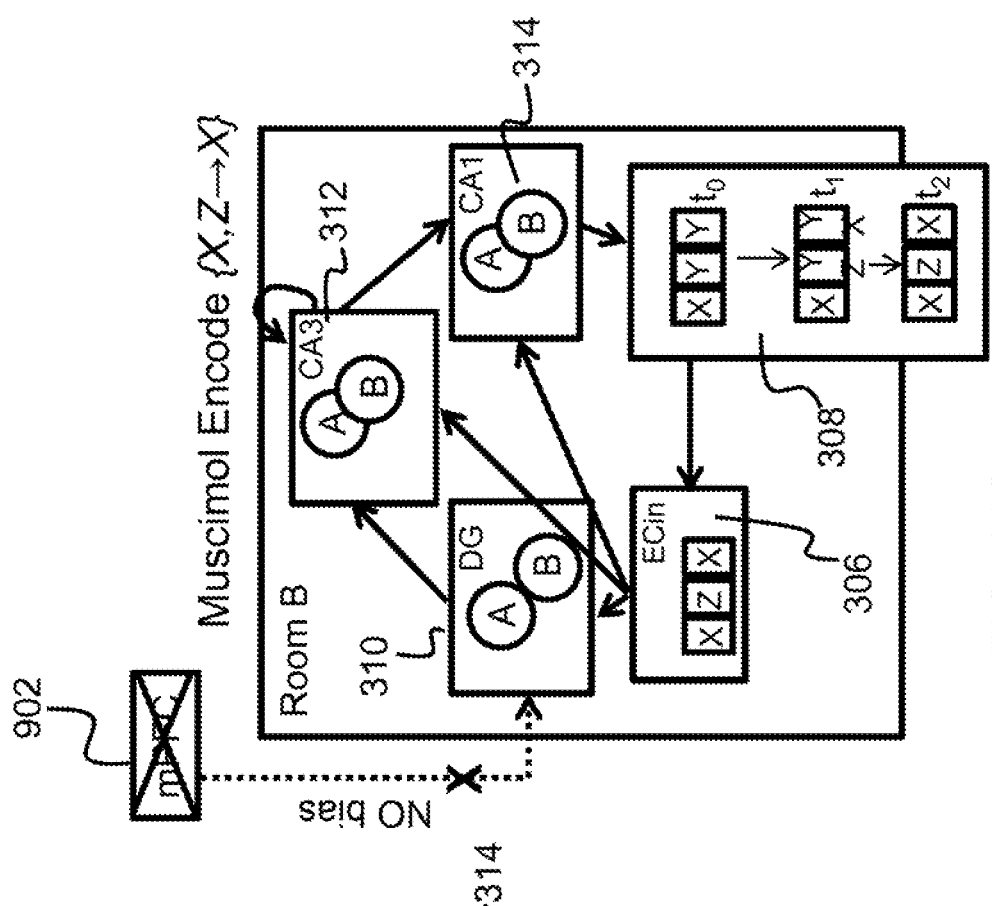
FIG. 11C illustrates encoding for a conflicting associative memory without mPFC contextual bias according to embodiments of the present disclosure.
Figure 11B:
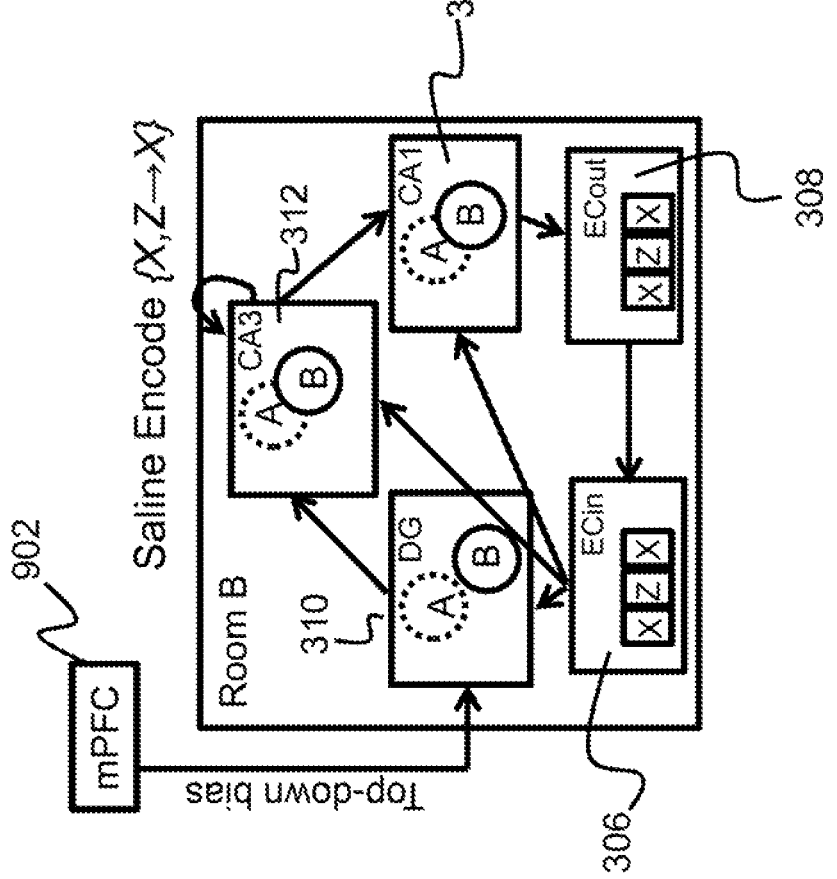
FIG. 11B illustrates encoding for a conflicting associative memory with mPFC contextual bias according to embodiments of the present disclosure.
Figures 11D, 11E:
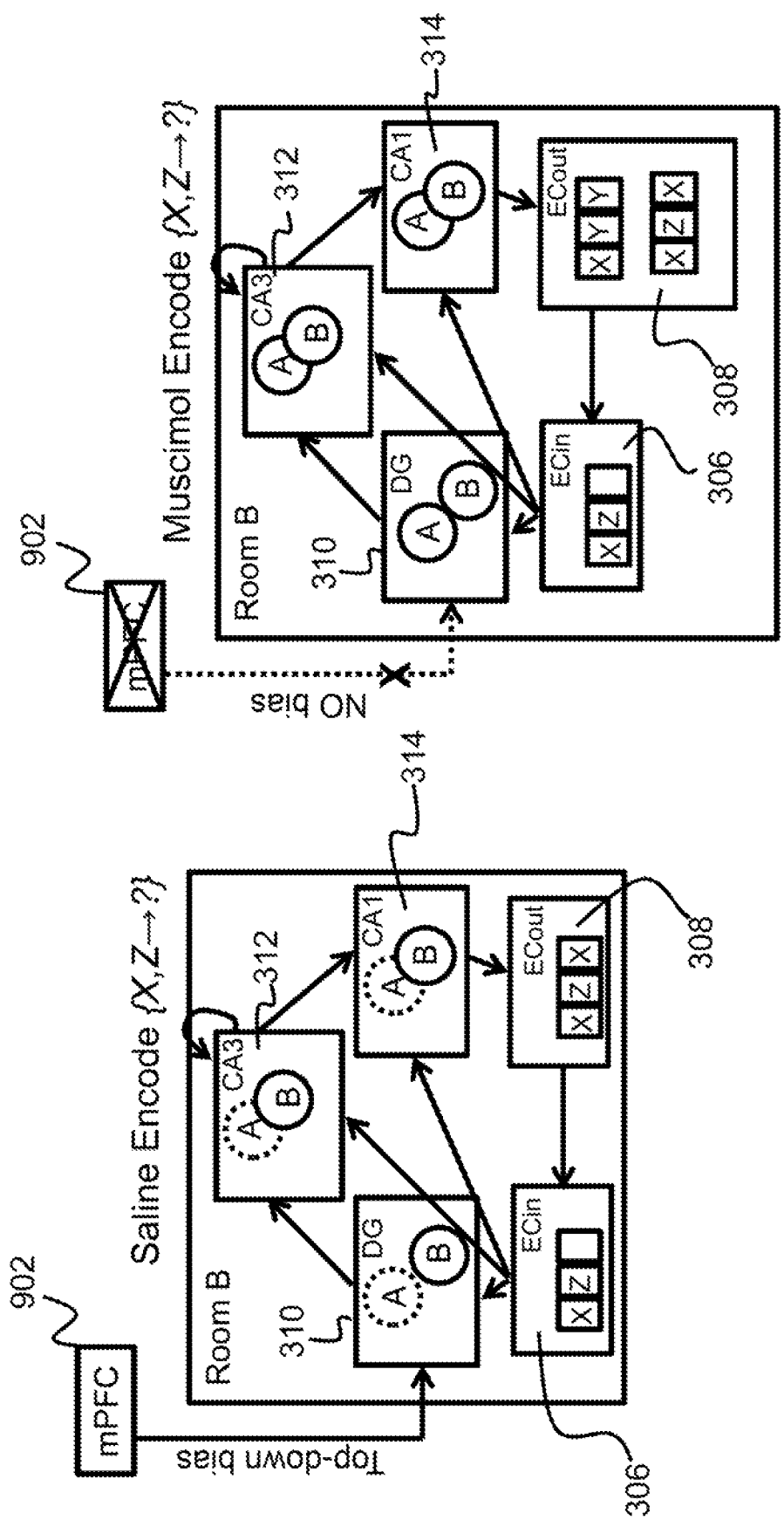
FIG. 11D illustrates retrieval for a conflicting associative memory with mPFC contextual bias according to embodiments of the present disclosure.
FIG. 11E illustrates retrieval for a conflicting associative memory without mPFC contextual bias according to embodiments of the present disclosure.

FIGS. 11A-11E illustrate how mPFC 902 bias on DG 310 affects memory encoding and recall by controlling the activation of memory traces within the hippocampal subfields (namely, DG 310, CA3 312, CA1 314). FIG. 11A depicts prior experience where an associative memory {X, Y→Y} is encoded in room A with top-down bias from mPFC 902. FIGS. 11B-11E depict the encoding (FIGS. 11B and 11C) and retrieval (FIGS. 11D and 11E) for a conflicting associative memory {X, Z→X} in room B with (FIGS. 11B and 11D) and without (FIGS. 11C and 11E) mPFC 902 contextual bias. Note that an intact mPFC 902 allows only context-appropriate memory traces to become active. With mPFC 902 inactivation, the learning of the conflicting association {X,Z→X} in room B is slowed because of the interfering memory traces triggered by concurrent activation of granule cells in the two DG 310 contextual ensembles in response to the common cue X (FIG. 11C). If the two memories {X,Y→Y} and {X,Z→X} were acquired in contexts A and B, respectively, under normal conditions, mPFC 902 inactivation during recall performance {X,Z→?} in context B would also lead to concurrent activation of memory traces related to both associations in response to the common cue X in all hippocampal subfields starting with DG 310 (FIG. 11E). Pattern completion processes in CA3 312 would then probabilistically converge to either memory engram in different trials, leading to impaired retrieval behavior. The inactivation condition in the model mechanism simulates an injury and/or dysfunction condition of the mPFC 902. Targeted neuromodulation of the mPFC 902 would alter this mechanism, allowing sufficient mPFC activity to disambiguate any conflicting associations learned in DG 310.

It is well accepted that DG 310 plays a crucial role in mediating the important sub-function of "pattern separation" (see Literature Reference No. 45 and 68), with the huge number of granule cells (see the table in FIG. 19) that are only sparsely activated, learning-induced neurogenesis during adulthood (see Literature Reference No. 23), and sparse connectivity within the input perforant path from EC. In the model described herein, DG 310 tends to create distinct neural representations in high-dimensional space for similar inputs from EC. CA3 312, with its random network comprising extensive recurrent collaterals (see Literature Reference No. 18), underlies the crucial sub-functions of "auto-association" during encoding and "pattern completion" during cue-triggered retrieval. Recurrent connections among model CA3 312 cells that are simultaneously activated by a current event are selectively strengthened in an activity-dependent manner, which thereby subsequently support pattern completion in response to a partial cue. As noted above, DG 310 itself projects to CA3 312 with extremely sparse, but potent, Mossy fibers (as described by Henze et al. in Literature Reference No. 26) contributing towards interference-free auto-association and pattern completion (see Literature Reference No. 40 for a description of interference-free auto-association and pattern completion, due to pattern separation in the DG). All of these properties work in conjunction with and are further enhanced by additional contextual recruitment of DG 310 cells, as described below.

During the plus phase, when the deep layers of EC (ECout 308) are clamped to the incoming cortical signals related to various aspects of an episode, the resulting activity pattern in CA1 314 (having been decoupled from CA3 312) is essentially an auto-encoded representation of the EC inputs. At the end of plus phase, the CA3-to-CA1 connections are adapted such that auto-associated CA3 312 activity pattern can reproduce the auto-encoded representation in CA1 314 during subsequent cue-based retrieval. CA1 314 is primarily controlled by CA3 312 during memory recall in response to a familiar cue in a familiar context, when influence of the direct perforant path from EC becomes suppressed (see Literature Reference No. 20 for pertinent data).

Given the specifics of the intra-hippocampal connectivity (shown in FIG. 9 and the table in FIG. 19), context-specific subsets are also triggered in CA3 312 and CA1 314 downstream from DG 310. However, CA3 312 and CA1 314 would exhibit appreciable overlap of cells participating in different contexts owing to the direct projections from superficial layers of EC, consistent with data described in Literature Reference Nos. 62 and 67).

Figure 12A:
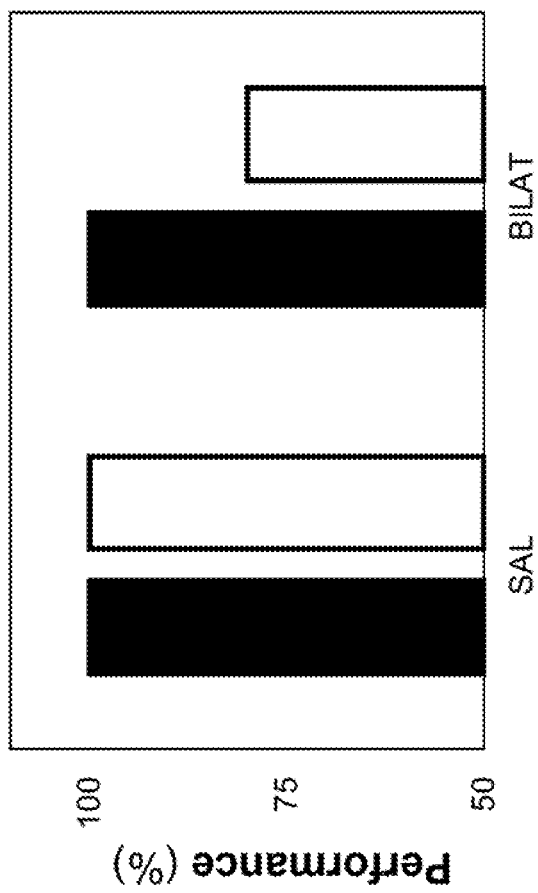
FIG. 12A illustrates results of the model simulation with and without mPFC inactivation in a context-guided object association task according to embodiments of the present disclosure.
Figure 12B:
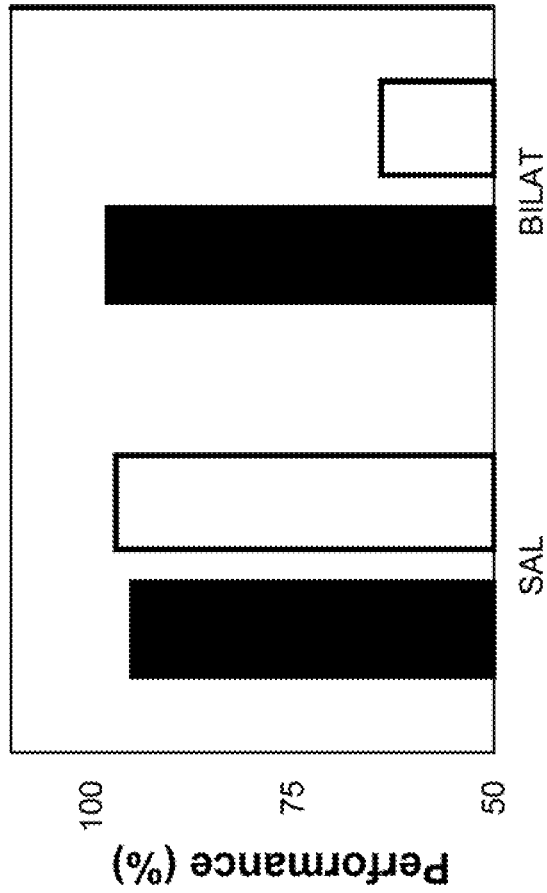
FIG. 12B illustrates results of memory retrieval performance data with and without mPFC inactivation in a context-guided object association task according to prior art.

It was hypothesized and then demonstrated that the contextual Mossy fibers from DG 310 to CA3 312 can bias the selection of the appropriate attractor state within the CA3 312 recurrent network in response to cues shared between multiple familiar contexts. FIGS. 12A and 12B illustrate a comparison between the results of the model simulation (FIG. 12A) and memory retrieval performance data from Navawongse and Eichenbaum (see Literature Reference No. 56) with and without mPFC inactivation in the context-guided object association task (FIG. 12B). The black bars correspond to control conditions, and the white bars reflect either saline injection (SAL) or bilateral mPFC inactivation by muscimol (BILAT). As in the experiment of Navawongse and Eichenbaum (see Literature Reference No. 56), the modeled rats learned to perform the contextual odor discrimination task almost perfectly. Additionally, the modeled rats exhibited highly impaired performance when their mPFC was inactivated (t(10)=47.47, P=0).

As shown in FIGS. 13A-13D, the model according to embodiments of the present disclosure also matches data from Experiment 1A of Peters et al. (see Literature Reference No. 61), which shows that mPFC inactivation can also affect memory function to discriminate between various pairs of odors even if they have only been presented in a single context. In FIGS. 13A-13D, the unbolded lines represent the saline condition, and the bolded lines represent the muscimol condition. Specifically, FIGS. 13A-13D depict a comparison between the results of model simulation (FIGS. 13A and 13C) and data from Experiment 1A of Peters et al. (FIGS. 13B and 13D) related to the effects of mPFC inactivation on the concurrent acquisition (FIGS. 13A and 13B) and performance (FIGS. 13C and 13D) of multiple odor discrimination memories. The muscimol condition corresponds to mPFC inactivation during the first three (3) training sessions (depicted by the box in FIGS. 13A and 13B), and the saline condition is the control. CR on the x-axis in FIGS. 13A-13D refers to the training session in which rats reached criterion performance. Controls rats with saline injection during acquisition received muscimol infusion during the three (3) test sessions following acquisition to behavioral criterion (depicted by the box in FIGS. 13C and 13D), but not the muscimol rats.

Figures 13C, 13D:
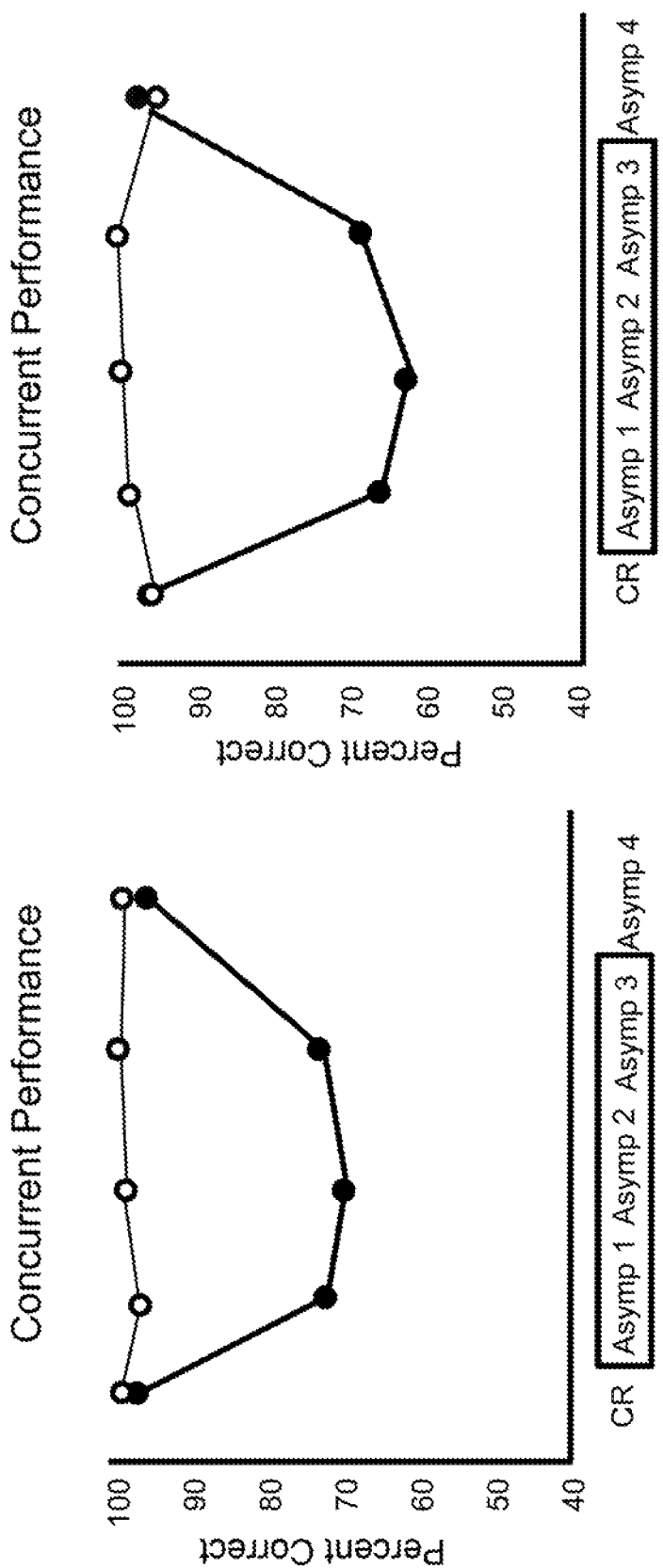
FIG. 13C illustrates results of the model simulation related to the effects of mPFC inactivation of concurrent performance of multiple odor discrimination memories according to embodiments of the present disclosure.
FIG. 13D illustrates data related to the effects of mPFC inactivation of concurrent performance of multiple odor discrimination memories according to prior art.

Both control and muscimol rats in the present model showed evidence of learning (F(2,39)=52.33, P=0), similar to experimental data (FIGS. 13A and 13B). Moreover, model muscimol rats learned a set of multiple discrimination memories less accurately than control rats through the acquisition to behavioral criterion (F(1,12)=34.37, P=0; FIG. 13A). No significant interaction between mPFC inactivation and acquisition occurred in the present model (F(2, 24)=0.11, P=0.90), thereby matching experimental data. Similarly, after concurrent acquisition to criterion performance, muscimol infusion severely impaired the retrieval behavior of the model control rats with respect to the memories that were well formed (F(1,12)=527.5, P=0; FIG. 13C). Finally, when inactivation ceased for the last performance session, retrieval behavior was the same between both groups of rats (t(12)=0.858, P=0.40, FIG. 13C), as seen in the data (FIG. 13D).

FIGS. 11A-11E also provide an intuitive illustration of the model explanation for the impairment of memory encoding and retrieval that result from mPFC 902 inactivation according to embodiments of the present disclosure. In the absence of inhibitory control by mPFC 902 (FIGS. 11C and 11E), various sorts of context-inappropriate memory traces simultaneously emerge in the subfields of the hippocampus. In the model described herein, the cause of these interfering neural signals is the indiscriminative activation of cells within the multiple contextual groups in DG 310 that are tuned to one or more items in the current input. These DG 310 traces promote the activation of their corresponding attractor states within the CA3 312 recurrent network via their previously tuned Mossy fiber projections 910. The presence of multiple potential CA3 312 attractor states proactively conflicts with the auto-associative learning of the current activity pattern within CA3 312 during encoding. In particular, CA3 312 could randomly slip into one of the attractor states (varying between the training sessions).

Further, the trial-to-trial learning of CA3-to-CA1 Schaffer collaterals 914 will be slower because of the lack of consistency in the emergent CA3 312 activity pattern (while the mPFC 902 is inactivated) for the same discrimination problem across the multiple acquisition trials. Moreover, the tuned Schaffer collaterals 914 to CA1 314 from CA3 312 cells representing a converged prior memory engram will also offer some inertia. Thus, it is the consequent activation of conflicting memory traces in CA3 312 due to mPFC 902 inactivation that slows the learning of new contextual memories (FIG. 11E). During cue-based retrieval of previously learned context-specific memories too, mPFC 902 inactivation causes the activation of inappropriate cells in CA3 312. Similar to encoding for the muscimol condition, during recall as well, there would be competition among multiple potential attractor states within CA3 312. It is also possible the CA3 312 recurrent network (represented by element 912) may not converge to any previously learned memory engram pattern because the various activated traces are too fragmentary. In any case, the prior tuned CA3-to-CA1 and CA1-to-ECout projections would likely not generate the correct recall pattern in the deep layers of EC (element 901), as shown in FIG. 11E.

The model according to embodiments of the present disclosure also simulates results from Experiment 1B of Peters et al. (see Literature Reference No. 61 for a description of Experiment 1B) in which rats learned each odor discrimination memory exclusively to criterion before training on another in the set, as shown in FIGS. 14A and 14B. In FIGS. 14A and 14B, the unbolded lines represent the saline condition, and the bolded lines represent the muscimol condition. Additionally, the white bars represent the saline condition, and he black bars represent the muscimol condition. Specifically, a comparison between the results of the model simulation (FIG. 14A) and data from Experiment 1B of Peters et al. (FIG. 14B) related to the effects of mPFC inactivation on the blocked acquisition of several memories one at a time is depicted. The muscimol condition corresponds to mPFC inactivation, and the saline condition is the control. Performance is shown for each discrimination problem (P). The inset in each of FIGS. 14A and 14B shows the number of trials to criterion for the saline and muscimol conditions with the discrimination problems divided into two halves based on learning difficulty.

As in the data (FIG. 14B), model muscimol rats (FIG. 14A) were overall slower in acquiring the memories (trials to criterion difference: $t(10)=2.16$, $P=0.0375$), and less accurate through their blocked acquisition (percent correct difference: $t(10)=3.16$, $P=0.0002$). When the odor discrimination problems were separated into the best and worst halves according to the trials to criterion in training, both the model and experimental data show an interaction between discrimination difficulty and inactivation factors ($F(1,10)=8.23$, $P<0.01$, two-way ANOVA). Peters et al (see Literature Reference No. 61) interpreted this data as implying that mPFC is not critical when acquiring memories one at a time in a single context, but that mPFC is essential for memory-guided discrimination when many problems must be learned and remembered at the same time.

In contrast, experimental simulations (FIG. 14A) suggest that interference from older memories is potentially present even for exclusive acquisition of single memories, and the strength of interference is not equal for all memories. Additionally, the encoding process cannot be equal for all memories. It depends on particular high-level cortical patterns that need to be encoded and the precise connectivity structure within the entorhinal-hippocampal system at the time of encoding.

Figure 15B:
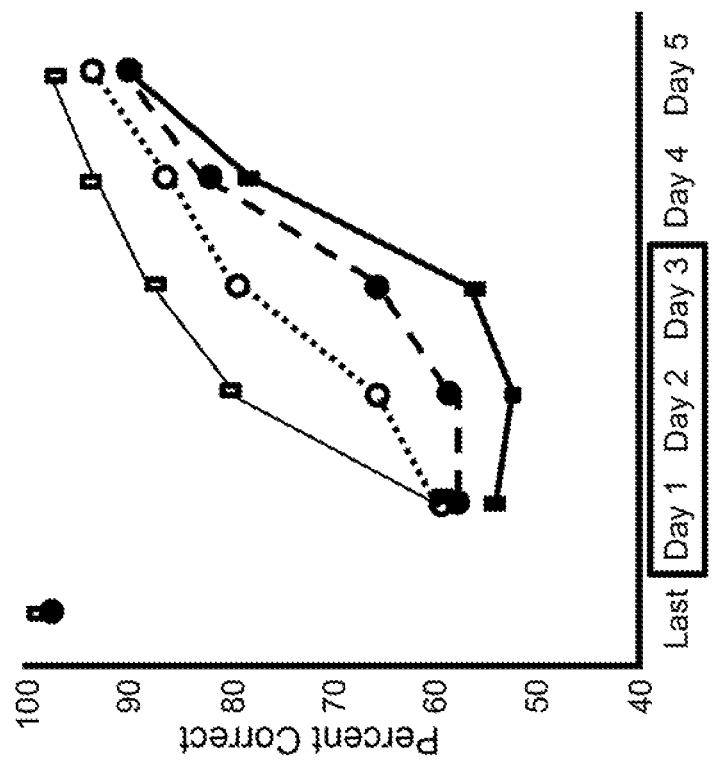
FIG. 15B illustrates data related to the effects of mPFC inactivation in the acquisition of List 2 memories according to prior art.
Figure 15A:
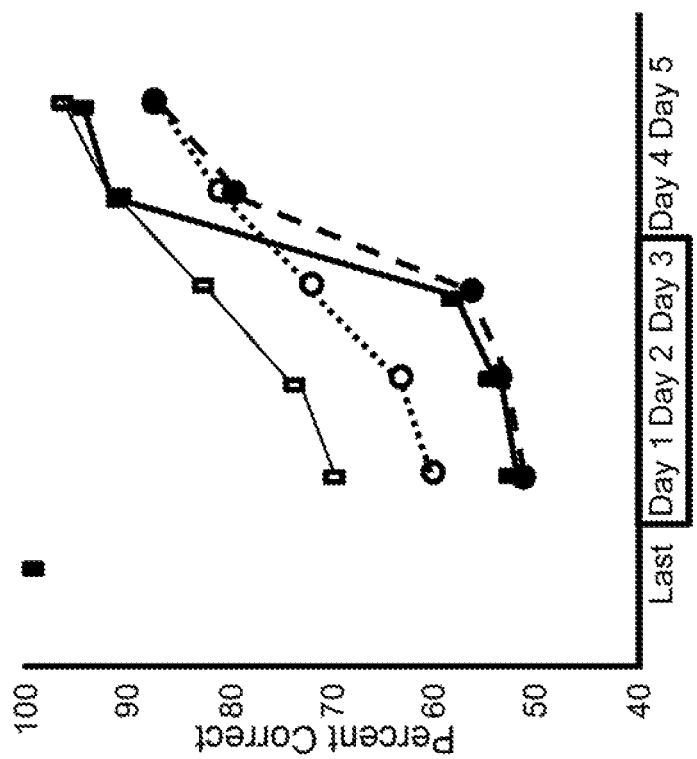
FIG. 15A illustrates results of the model simulation related to the effects of mPFC inactivation in the acquisition of List 2 memories according to embodiments of the present disclosure.
Figure 16B:
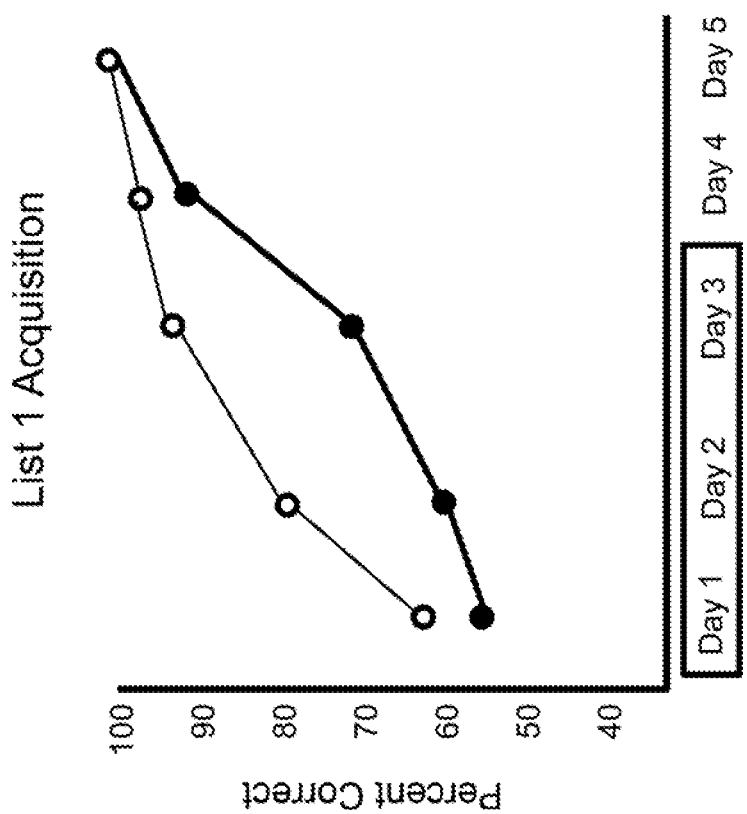
FIG. 16B illustrates data related to encoding of List 1 memories according to prior art.
Figure 16A:
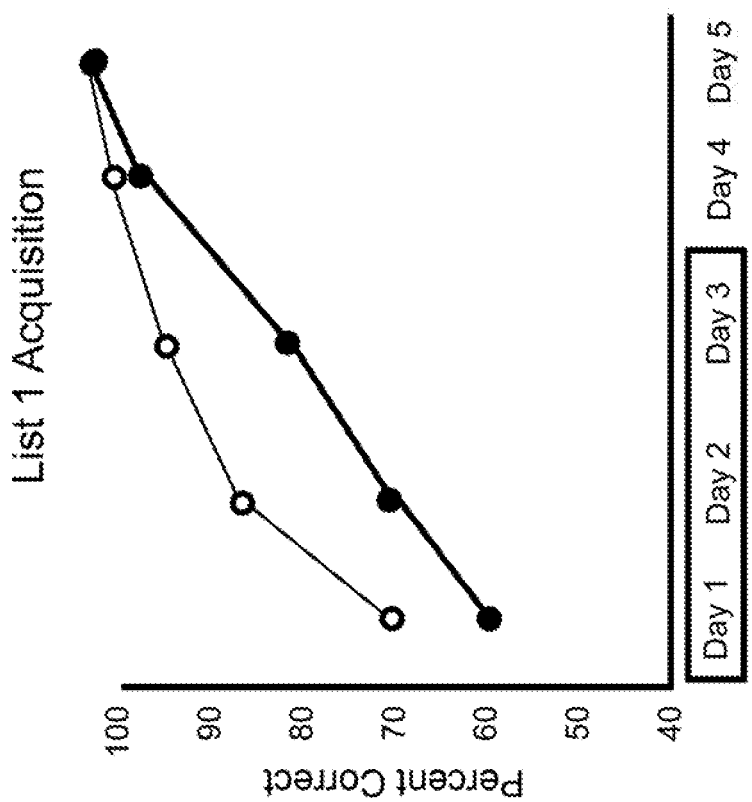
FIG. 16A illustrates results of the model simulation related to encoding of List 1 memories according to embodiments of the present disclosure.
Figure 16D:
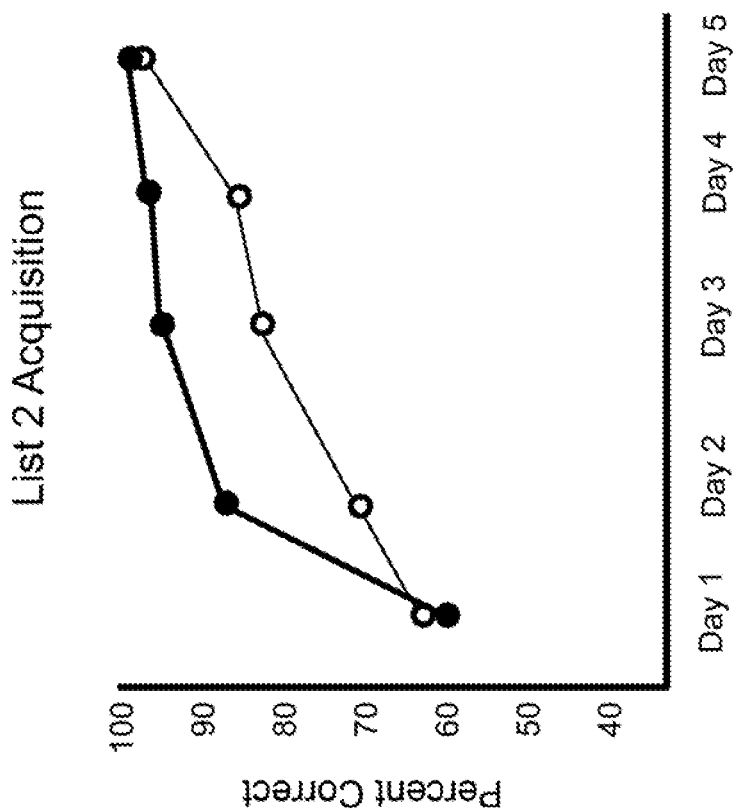
FIG. 16D illustrates data related to acquisition of List 2 memories following the encoding of conflicting List 1 memories according to prior art.
Figure 16C:
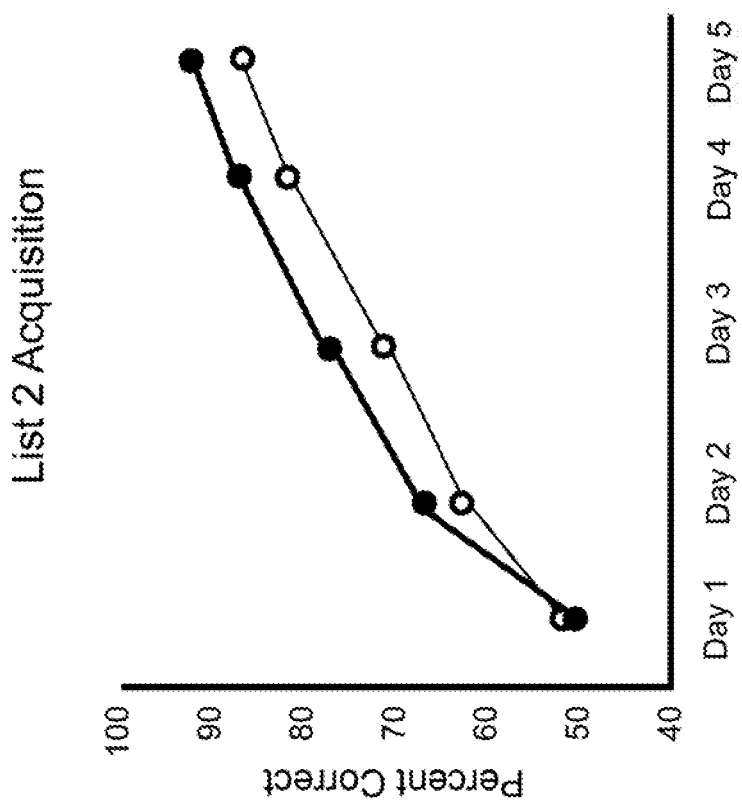
FIG. 16C illustrates results of the model simulation related to acquisition of List 2 memories following the encoding of conflicting List 1 memories according to embodiments of the present disclosure.

The experimental simulations performed also match data from Experiment 2 of Peters et al., which are related to the effects of mPFC inactivation on the dynamics of acquiring mismatching memories in the same and different contexts, as illustrated in FIGS. 15A-15F. Specifically, a comparison between the results of the model simulation (FIGS. 15A, 15C, and 15E) and data from Experiment 2 of Peters et al. (FIGS. 15B, 15D, and 15F) related to the effects of mPFC inactivation on the acquisition of List 2 memories, which conflict with List 1 memories, under various conditions. In FIGS. 15A and 15B, the unbolded solid lines and unfilled squares represent saline with same conditions; the dashed lines and unfilled circles represent saline with different conditions; the bold solid lines and filled squares represent muscimol with same conditions; and the dashed lines and filled circles represent muscimol with different conditions. The muscimol condition corresponds to mPFC inactivation during the first three (3) sessions for List 2 acquisition (depicted by the box in FIGS. 15A and 15B), and the saline condition is the control. Same and different conditions correspond to whether List 2 is acquired in the same context as List 1.

FIGS. 15C and 15D provide the amount of interference from List 1 on the acquisition on List 2 memories in the different context (called Interference Index) for the two mPFC inactivation conditions. In FIGS. 15C and 15D, the white bars represent the saline condition, and the black bars represent the muscimol condition.

FIGS. 15E and 15F show the overall number of perseverative and non-preservative errors in the discriminative choices while acquiring List 2 memories. In FIGS. 15E and 15F, the black bars represent preservative errors, and the white bars represent non-preservative errors.

Data from control rats were simulated on the well-known effect of slower learning in a context where conflicting memories were previously formed (see Literature Reference No. 13). The four different groups of model rats (inactivation condition X context) first learned the list of memories employed in Experiment 1 (called List 1) of Peter et al. (see Literature Reference No. 61) and showed no difference in recall performance following acquisition to behavioral criterion ($F(3,20)=1.17$, $P<0.34$). Model muscimol rats replicate data for mPFC inactivation in that they do not differentiate between the same and different contexts with respect to encoding the new memories from List 2 that interfere with older memories from List 1 (main effect of inactivation, $F(1,20)=79.4$, $P=0$, two-way ANOVA), as depicted in FIGS. 15A and 15B.

Further, the interference in learning List 2 memories from List 1 was higher for muscimol rats than control rats ($t(22)=2.33$, $P<0.05$ (FIG. 15C). This was quantified using the metric of interference index, which is defined as the difference (%) between the average percent correct for List 2 (context B) and that for List 1 (context A) in the their first five (5) blocks of memory acquisition. While the overall number of errors also increased for the model muscimol rats (main effect of inactivation, $F(1,22)=6.33$, $P<0.05$, two-way ANOVA), the numbers of perseverative and non-perseverative errors were also not significantly different between the control and muscimol rats (no interaction between error type and inactivation condition, $F=0.16$, $P=0.70$, two-way ANOVA), as illustrated in FIGS. 15E and 15F. A perseverative error is defined as choosing an odor in a List 2 problem that was also present in List 1 and was the one that was rewarded in its List 1 problem. A non-perseverative error is one in which a new odor in a List 2 problem is chosen when it is paired with an old, unrewarded odor from List 1.

When learning a List 2 problem in the same context, interference occurs because of the activation of conflicting memory traces (related to the corresponding association from List 1) in all hippocampal subfields in general, and CA3 in particular. The projections from each CA3 engram corresponding to a List 1 associative memory to CA1 need to overcome their prior tuning before a new connectivity can be established to be able to correctly retrieve the List 2 memory. This impairment, which slows encoding, is not applicable if List 2 memories are acquired in a new context. When mPFC is inactivated, there is even greater interference because the lack of top-down bias over DG allows the activation of innumerable traces within various contextual groups of DG cells that are only partially consistent with a current association to be encoded, including the memory traces corresponding to List 1. Refer to FIGS. 11A-11E and the explanation provided above for how this phenomenon leads to severely impaired plasticity of projections within CA3 and of those from CA3 to CA1. Therefore, the acquisition of List 2 memories was drastically affected by mPFC inactivation, and also did not benefit from acquisition in a new context.

FIGS. 16A-16D provide simulation results of the model according to embodiments of this disclosure that match data from Experiment 3 of Peters et al. (see Literature Reference No. 61), which shows that rats that learned the first set of odor memories with an inactivated PFC were surprisingly better at acquiring the second set of interfering memories in the same context under normal PFC conditions. In FIGS. 16A-16D, unbolded lines and unfilled circles represent the saline condition, and bold lines and filled circles represent the muscimol condition. Similar to Experiment 1A, model muscimol rats were less accurate in learning List 1 memories compared to control rats (main effect of inactivation, $F(1,10)=8.5$, $P<0.01$, ANOVA). One would expect impaired learning of List 2 due to prior encoding of conflicting List 1 memories in the same context A. However, as in the experimental data, model muscimol rats did not have this impairment ($t(10)=1.597$, $P=0.12$). Further, the performance trend switched order between the inactivation conditions for the acquisition of List 2. Note that muscimol rats did not have their mPFC inactivated during List 2 learning.

In the model described herein, List 1 memories for muscimol rats were initially acquired with non-specific activation of related memory traces in DG across multiple contextual groups of cells. CA3 memory engrams, thus, gradually became tuned to these DG cells from various contexts during initial encoding. While the muscimol rats did continue learning for two additional blocks with the mPFC contextual bias over the DG in place, this suggests that the distributed projections from across the DG to List 1 memory engrams in CA3 were sufficiently preserved when the rats started learning List 2. However, model muscimol rats could perform at higher levels in the last two (2) blocks, compared to the first three (3) blocks, with only the context A-specific DG group facilitated due to robust pattern completion within CA3 in response to fragmented DG inputs. During List 2 acquisition, the activation of the conflicting memory engram in CA3 for muscimol rats is not as strong as that for control rats because of two reasons. Namely, the DG support is shrunk to just one contextual group, and the memory traces within this DG group is relatively weak as the basis for activation is just one common item between the List 1 and List 2 problems. This results in lesser interference for List 2 acquisition from List 1 memory traces for muscimol rats, explaining the reversal in the encoding dynamics for List 2 for the muscimol and control rats.

FIGS. 16A-16D depict the comparison between the results of the model simulation (FIGS. 16A and 16C) and data from Experiment 3 of Peters et al. (FIGS. B and D) on the acquisition of List 2 memories (FIGS. 16C and 16D) following the encoding of conflicting List 1 memories (FIGS. 16A and 16B) in the same context with and without mPFC inactivation. The muscimol condition corresponds to mPFC inactivation during only the first three (3) sessions of List 1 acquisition (depicted by the box in FIGS. 16A and 16B), and the saline condition is the control.

FIG. 17 depicts a table including values for various parameters in each sub-region within the entorhinal-hippocampal model according to embodiments of the present disclosure that were used to simulate the experimental data related to the effects of mPFC inactivation on memory encoding and recall behavior. Parameter values for the connections among various sub-regions are provided in the table in FIG. 18, and the size of each sub-region is reported in the table in FIG. 19. Note that all sub-regions share the same parameter values, except for the level of sparseness in activity (namely, k in Equation (5)). Consistent with data presented in Literature Reference Nos. 15 and 30, DG is the sparsest compared to CA3 and CA1 in the hippocampus (archicortex), which are still less sparse relative to the superficial and deep layers of EC (neocortex).

FIG. 18 depicts a table including details of the connections among various sub-regions within the entorhinal-hippocampal model according to embodiments of the present disclosure, including the type of connectivity (namely, one-to-one, all-to-all, sparse with probability p), the proportion of Hebbian learning compared to error-driven learning ($0 \leq k\_hebb \leq 1$ in Equation (6)), and the values for absolute scaling parameter and relative weight (see $a_j$ and $r_j$ in Equation (3)). Parameter $\epsilon$, that scales the rate of learning, is set to 0.01 for all connections.

FIG. 19 shows a table including a comparison of relative sizes, based on the number of principal neurons, of various sub-regions within the entorhinal-hippocampal system between rat and human data from Literature Reference No. 11 and the model according to embodiments of the present disclosure.

The invention described herein is a mechanistic explanation for how the hippocampus resolves interference when encoding and retrieving conflicting associative memories experienced in different contexts based on top-down signals from the medial prefrontal cortex (mPFC). Specifically, the fact that an exogenous inhibitory bias that modulates cell excitability to select a contextually relevant subset of dentate gyrus (DG) neurons is sufficient to replicate recent rat data on various effects of mPFC inactivation on memory formation and recall is demonstrated. Such inhibitory control signals can originate from mPFC and arrive at DG via supramammilary nucleus (SuMN) of hypothalamus. SuMN is connected strongly to DG as well as several structures that project to the hippocampus, and has been suggested to gate the flow of neural signals within the hippocampus by modulating cell excitability.

"Context" is defined as the implicit background of a situation (e.g., home, office) in which episodes involving salient objects in the foreground occur, which can help to flexibly disambiguate perception of stimuli, memory recall, and choice of actions. Several studies have implicated PFC in rapid extraction of contextual information, which is then leveraged for top-down contextual facilitation of memory-related functions ranging from recognition to recall. Moreover, different sub-regions of left PFC have been shown to be involved in various aspects of cue-based episodic memory retrieval. This emerging understanding is in concert with the proposal of PFC being the source of contextual bias to the hippocampus. Other models exist where contextual information arrives at the hippocampus through the entorhinal cortex (EC) as an explicit input that is associated with inputs for salient objects to form an episodic memory, such as models presented in Literature Reference Nos. 58 and 59. These Complementary Learning Systems (described in Literature Reference No. 60) models perform pattern completion for the AB-AC associative learning task using EC as the gateway for cortical inputs representing list elements and context, and result in the DG encoding of context and list items as a joint representation. Although the CLS models could, in theory, simulate context-dependent memory retrieval by providing context as one of the recall cues, they wouldn't exhibit contextual grouping of cells within the DG. Very similar list items in different contexts would result in significantly overlapping DG ensembles across contexts, unlike well-known data (see below).

Computational work described by Doboli et al. (see Literature Reference No. 19) simulates the recruitment and sustenance of contextual ensembles ("latent attractors") of DG cells, while responding to time-varying inputs from EC. Indeed, as EC inputs change, different cells within the winner DG group become active. In the model described herein, contextual hilar cells within DG are pre-configured to receive excitatory projections from the corresponding granule cells, while they inhibit granule cells configured for the other contexts, and vice versa. Recruitment of an arbitrary group can be achieved by an excitatory perturbation of the appropriate set of DG cells, pointing to potential external control from PFC.

In summary, the memory model according to embodiments of the present disclosure provides a computational account for the PFC-mediated contextual modulation of encoding and recall processes in the hippocampus, which can be used to improve memory function in, for instance, autonomous systems. Non-limiting examples of autonomous systems include robots and autonomous vehicles, such as cars. For example, an autonomous vehicle could receive as input a set of memories through supervised context-relevant experiences, such as approaching a pedestrian. In this example, the presence of a pedestrian in the street ahead is a context, and the memory is the appropriate action of stopping until the pedestrian is out of the way. The rewards would be supplied by the programmer when the vehicle properly performs a context-appropriate action, such as stopping to avoid a collision or pausing to let a car get out of a driveway. Thus, at least one retrieved encoded context-appropriate memory would be used to determine whether to initiate a collision avoidance operation to cause the vehicle to proactively avoid a collision, including operations such as braking, steering, accelerating, and deaccelerating.

Furthermore, the neural model can be used to guide targeted neuromodulation to improve memory function. As a non-limiting example, the neural model can be used in conjunction with other models that simulate the electromagnetic field effects from transcranial stimulation for the purpose of neuromodulation. For instance, the electromagnetic field model can be used to design the electrode montage that best stimulates the mPFC. The neural model can then be used to simulate the important contextual effects on hippocampal encoding and recall when the mPFC is stimulated.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for storing and retrieving memories in context, the system comprising:
   one or more processors and a non-transitory computer-readable medium having executable instructions encoded thereon such that when executed, the one or more processors perform operations of:
   maintaining a list of context components;
   encoding a context-specific memory in a neural model of the entorhinal-hippocampal system, wherein the neural model comprises a memory input layer, a context bias layer, and a dentate gyrus (DG) layer comprising a plurality of DG subpopulations of neural units biased by the context bias layer,
   wherein the context-specific memory is a memory experienced in a specific context, the memory comprising relevant salient features of an environment surrounding a vehicle and the context comprising relevant non-salient features of the environment;
   wherein each context component in the list of context components comprises an index that identifies an index of a single DG subpopulation;
   upon experiencing the specific context, determining a match with one of the context components to identify which one of the plurality of DG subpopulation is allowed to become active and retrieve the context-specific memory, whereby the context is used to distinguish between similar memories that occur in different contexts; and
   using the retrieved context-specific memory, determining whether to initiate a collision avoidance operation to cause the vehicle to proactively avoid a collision.

2. The system as set forth in claim 1, wherein the context-specific memory is comprised of an association between presented environmental cues and presence of a rewarded event, wherein if the same environmental cue is presented across more than one context, different associations can be learned in different contexts.

3. The system as set forth in claim 1, wherein the one or more processors further perform an operation of discriminating between environmental cues in the environment surrounding the vehicle, wherein discrimination between environmental cues occurs even if the environmental cues have only been presented in a single context.

4. The system as set forth in claim 1, where in retrieving the context-appropriate memory, performing operations of:
applying an incomplete memory pattern to the memory input layer;
applying a context component input to the context bias layer; and
outputting the context-specific memory when the incomplete memory pattern is completed.

5. A computer-implemented method for storing and retrieving memories in context, comprising:
an act of causing one or more processors to execute instructions stored on a non-transitory memory such that upon execution, the one or more processors perform operations of:
maintaining a list of context components;
encoding a context-specific memory in a neural model of the entorhinal-hippocampal system, wherein the neural model comprises a memory input layer, a context bias layer, and a dentate gyrus (DG) layer comprising a plurality of DG subpopulations of neural units biased by the context bias layer,
wherein the context-specific memory is a memory experienced in a specific context, the memory comprising relevant salient features of an environment surrounding a vehicle and the context comprising relevant non-salient features of the environment;
wherein each context component in the list of context components comprises an index that identifies an index of a single DG subpopulation;
upon experiencing the specific context, determining a match with one of the context components to identify which one of the plurality of DG subpopulation is allowed to become active and retrieve the context-specific memory, whereby the context is used to distinguish between similar memories that occur in different contexts; and
using the retrieved context-specific memory, determining whether to initiate a collision avoidance operation to cause the vehicle to proactively avoid a collision.

6. The method as set forth in claim 5, wherein the context-specific memory is comprised of an association between presented environmental cues and presence of a rewarded event, wherein if the same environmental cue is presented across more than one context, different associations can be learned in different contexts.

7. The method as set forth in claim 5, wherein the one or more processors further perform an operation of discriminating between environmental cues in the environment surrounding the vehicle, wherein discrimination between environmental cues occurs even if the environmental cues have only been presented in a single context.

8. The method as set forth in claim 5, where in retrieving the context-appropriate memory, performing operations of:
applying an incomplete memory pattern to the memory input layer;
applying a context component input to the context bias layer; and
outputting the context-specific memory when the incomplete memory pattern is completed.

9. A computer program product for storing and retrieving memories in context, the computer program product comprising:
computer-readable instructions stored on a non-transitory computer-readable medium that are executable by a computer having one or more processor for causing the processor to perform operations of:
maintaining a list of context components;
encoding a context-specific memory in a neural model of the entorhinal-hippocampal system, wherein the neural model comprises a memory input layer, a context bias layer, and a dentate gyrus (DG) layer comprising a plurality of DG subpopulations of neural units biased by the context bias layer,
wherein the context-specific memory is a memory experienced in a specific context, the memory comprising relevant salient features of an environment surrounding a vehicle and the context comprising relevant non-salient features of the environment;
wherein each context component in the list of context components comprises an index that identifies an index of a single DG subpopulation;
upon experiencing the specific context, determining a match with one of the context components to identify which one of the plurality of DG subpopulation is allowed to become active and retrieve the context-specific memory, whereby the context is used to distinguish between similar memories that occur in different contexts; and
using the retrieved context-specific memory, determining whether to initiate a collision avoidance operation to cause the vehicle to proactively avoid a collision.

10. The computer program product as set forth in claim 9, wherein the context-specific memory is comprised of an association between presented environmental cues and presence of a rewarded event, wherein if the same environmental cue is presented across more than one context, different associations can be learned in different contexts.

11. The computer program product as set forth in claim 9, wherein the one or more processors further perform an operation of discriminating between environmental cues in the environment surrounding the vehicle, wherein discrimination between environmental cues occurs even if the environmental cues have only been presented in a single context.

12. The computer program product as set forth in claim 9, where in retrieving the context-appropriate memory, performing operations of:
applying an incomplete memory pattern to the memory input layer;
applying a context component input to the context bias layer; and
outputting the context-specific memory when the incomplete memory pattern is completed.

* * * * *